(12) United States Patent
Holzwarth

(10) Patent No.: US 7,555,357 B2
(45) Date of Patent: Jun. 30, 2009

(54) METHOD FOR BUILDING THREE-DIMENSIONAL OBJECTS WITH EXTRUSION-BASED LAYERED DEPOSITION SYSTEMS

(75) Inventor: Donald J. Holzwarth, Minnetonka, MN (US)

(73) Assignee: Stratasys, Inc., Eden Prairie, MN (US)

( * ) Notice: Subject to any disclaimer, the term of this patent is extended or adjusted under 35 U.S.C. 154(b) by 396 days.

(21) Appl. No.: 11/343,355

(22) Filed: Jan. 31, 2006

(65) Prior Publication Data

US 2007/0179657 A1    Aug. 2, 2007

(51) Int. Cl.
G06F 19/00 (2006.01)
(52) U.S. Cl. .................... 700/119; 700/186; 700/98; 700/118
(58) Field of Classification Search ......... 700/118–119, 700/184, 98; 264/219–220, 401
See application file for complete search history.

(56) References Cited

U.S. PATENT DOCUMENTS

| | | | |
|---|---|---|---|
| 4,665,492 A | 5/1987 | Masters | |
| 4,749,347 A | 6/1988 | Valavaara | |
| 4,961,154 A | 10/1990 | Pomerantz et al. | |
| 5,059,266 A | 10/1991 | Yamane et al. | |
| 5,121,329 A | 6/1992 | Crump | |
| 5,134,569 A | 7/1992 | Masters | |
| 5,136,515 A | 8/1992 | Helinski | |
| 5,140,937 A | 8/1992 | Yamane et al. | |
| 5,149,548 A | 9/1992 | Yamane et al. | |
| 5,204,055 A | 4/1993 | Sachs et al. | |
| 5,216,616 A | 6/1993 | Masters | |
| 5,303,141 A | 4/1994 | Batchelder et al. | |
| 5,340,433 A | 8/1994 | Crump | |
| 5,402,351 A | 3/1995 | Batchelder et al. | |
| 5,474,719 A | 12/1995 | Fan et al. | |
| 5,503,785 A | 4/1996 | Crump et al. | |
| 5,587,913 A | 12/1996 | Abrams et al. | |
| 5,594,652 A | 1/1997 | Penn et al. | |
| 5,695,707 A | 12/1997 | Almquist et al. | |
| 5,738,817 A | 4/1998 | Danforth et al. | |
| 5,764,521 A | 6/1998 | Batchelder et al. | |
| 5,807,437 A | 9/1998 | Sachs et al. | |
| 5,866,058 A | 2/1999 | Batchelder et al. | |
| 5,900,207 A | 5/1999 | Danforth et al. | |
| 5,939,008 A | 8/1999 | Comb et al. | |

(Continued)

OTHER PUBLICATIONS

"Rapid Prototyping: An Update on RP Applications Technology Improvements, and Developments in the Industry", by Terry T. Wohlers, Wohlers Associates, Copyright 1991.

(Continued)

*Primary Examiner*—Kidest Bahta
*Assistant Examiner*—Nathan Laughlin
(74) *Attorney, Agent, or Firm*—Westman, Champlin & Kelley, P.A.

(57) ABSTRACT

A method of forming a three-dimensional object using an extrusion-based layered deposition system, the method comprising generating a build path for building a layer of the three-dimensional object, where the build path defines a void region. The method further comprising generating at least one intermediate path in the void region, and generating a remnant path based at least in part on the at least one intermediate path.

19 Claims, 23 Drawing Sheets

U.S. PATENT DOCUMENTS

| | | | |
|---|---|---|---|
| 5,943,235 | A | 8/1999 | Earl et al. |
| 5,968,561 | A | 10/1999 | Batchelder et al. |
| 6,004,124 | A | 12/1999 | Swanson et al. |
| 6,022,207 | A | 2/2000 | Dahlin et al. |
| 6,054,077 | A | 4/2000 | Comb et al. |
| 6,067,480 | A | 5/2000 | Stuffle et al. |
| 6,085,957 | A | 7/2000 | Zinniel et al. |
| 6,129,872 | A | 10/2000 | Jang |
| 6,133,355 | A | 10/2000 | Leyden et al. |
| 6,162,378 | A | 12/2000 | Bedal et al. |
| 6,165,406 | A | 12/2000 | Jang et al. |
| 6,175,422 | B1 | 1/2001 | Penn et al. |
| 6,193,923 | B1 | 2/2001 | Leyden et al. |
| 6,214,279 | B1 | 4/2001 | Yang et al. |
| 6,261,077 | B1 | 7/2001 | Bishop et al. |
| 6,490,496 | B1 | 12/2002 | Dacey |
| 6,606,528 | B1 * | 8/2003 | Hagmeier et al. ............. 700/98 |
| 6,722,872 | B1 | 4/2004 | Swanson et al. |
| 6,813,594 | B2 | 11/2004 | Guertin et al. |
| 6,814,907 | B1 | 11/2004 | Comb |
| 6,823,230 | B1 * | 11/2004 | Jamalabad et al. .......... 700/119 |
| 6,859,681 | B1 * | 2/2005 | Alexander .................. 700/184 |
| 6,898,477 | B2 | 5/2005 | Loughran |
| 6,936,212 | B1 | 8/2005 | Crawford |
| 6,998,087 | B1 | 2/2006 | Hanson et al. |

OTHER PUBLICATIONS

"Installing a Rapid Prototyping System The Economic and Organizational Issues", by Terry T. Wohlers, Wohlers Associates, Copyright 1991.

"CAD Meets Rapid Prototyping", by Terry Wohlers, *Computer-Aided Engineering*, vol. 11, No. 4, Apr. 1992.

"Chrysler Compares Rapid Prototyping Systems", by Terry Wohlers, *Computer-Aided Engineering*, vol. 11, No. 10, Oct. 1992.

"The World of Rapid Prototyping", by Terry Wohlers, *Proceedings of the Fourth International Conference on Desktop Manufacturing*, Sep. 24-25, 1992, San Jose, CA.

* cited by examiner

METHOD FOR BUILDING THREE-DIMENSIONAL OBJECTS WITH EXTRUSION-BASED LAYERED DEPOSITION SYSTEMS

BACKGROUND OF THE INVENTION

The present invention relates to the fabrication of three-dimensional (3D) objects from computer-aided design (CAD) models using extrusion-based layered deposition systems. In particular, the present invention relates to generating build data for depositing roads of build material with extrusion-based layered deposition systems to form 3D objects.

An extrusion-based layered deposition system (e.g., fused deposition modeling systems developed by Stratasys, Inc., Eden Prairie, Minn.) is typically used to build a 3D object from a CAD model in a layer-by-layer fashion by extruding a flowable build material, such as a thermoplastic material. The build material is extruded through a nozzle carried by an extrusion head, and is deposited as a sequence of roads on a base in an x-y plane. The extruded build material fuses to previously deposited build material, and solidifies upon a drop in temperature. The position of the extrusion head relative to the base is then incremented along a z-axis (perpendicular to the x-y plane), and the process is then repeated to form a 3D object resembling the CAD model.

Movement of the extrusion head with respect to the base is performed under computer control, in accordance with build data from a host computer. The build data is obtained by initially slicing the CAD model of the 3D object into multiple horizontal layers (referred to herein as "sliced layers"). Then, for each sliced layer, the host computer generates a build path for depositing roads of build material to form the 3D object.

Each deposited road of build material has a road height along the z-axis. The road heights of the deposited roads are affected by a variety of factors, such as extrusion head speed, extrusion nozzle dimensions, and build material feed rates. These factors may be controlled such that the road heights are held constant, which is beneficial because the height of a given layer along the z-axis is based on the road heights of the deposited roads. Thus, when generating the build path for depositing roads of build material, a host computer may hold the road heights constant to ensure a substantially uniform layer thickness.

In addition to a road height, each deposited road of build material has a road width in the x-y plane, where the road width is proportional to the road height (e.g., about 20% greater than the road height). Because the road widths are proportional to the road heights, holding the road heights constant also holds the road widths constant as well. Based on these constant road widths, the host computer may generate the build path for depositing roads of build material based on a "road width resolution" that corresponds to the constant road widths. While relying on the given road width resolution, the host computer may properly offset each path so that the roads of build material are deposited adjacent each other without overlapping.

While relying on a constant road width resolution to generate a build path is beneficial for quickly generating build data and for rapid depositions of build material, it also presents an issue with small void regions that occur in the generated build path. Such void regions are typically smaller than the constant road width resolution, and therefore, are ignored during data generation. This may result in small cavities being formed between the deposited roads of build material, which correspondingly increases the porosity of the resulting 3D objects, thereby reducing the structural integrities and sealing properties of the resulting 3D objects. As such, there is a need for a method of generating build data that is effective for depositing roads of build material in small void regions.

BRIEF SUMMARY OF THE INVENTION

The present invention relates to a method of forming a 3D object using an extrusion-based layered deposition system. The method includes generating a build path for building a layer of the 3D object, where the build path defines a void region. The method further includes generating at least one intermediate path in the void region, and generating a remnant path based at least in part on the at least one intermediate path. The method is beneficial for reducing porosity within the 3D object, thereby preserving the structural integrity and the sealing properties of the 3D object.

DETAILED DESCRIPTION

Figure 1:
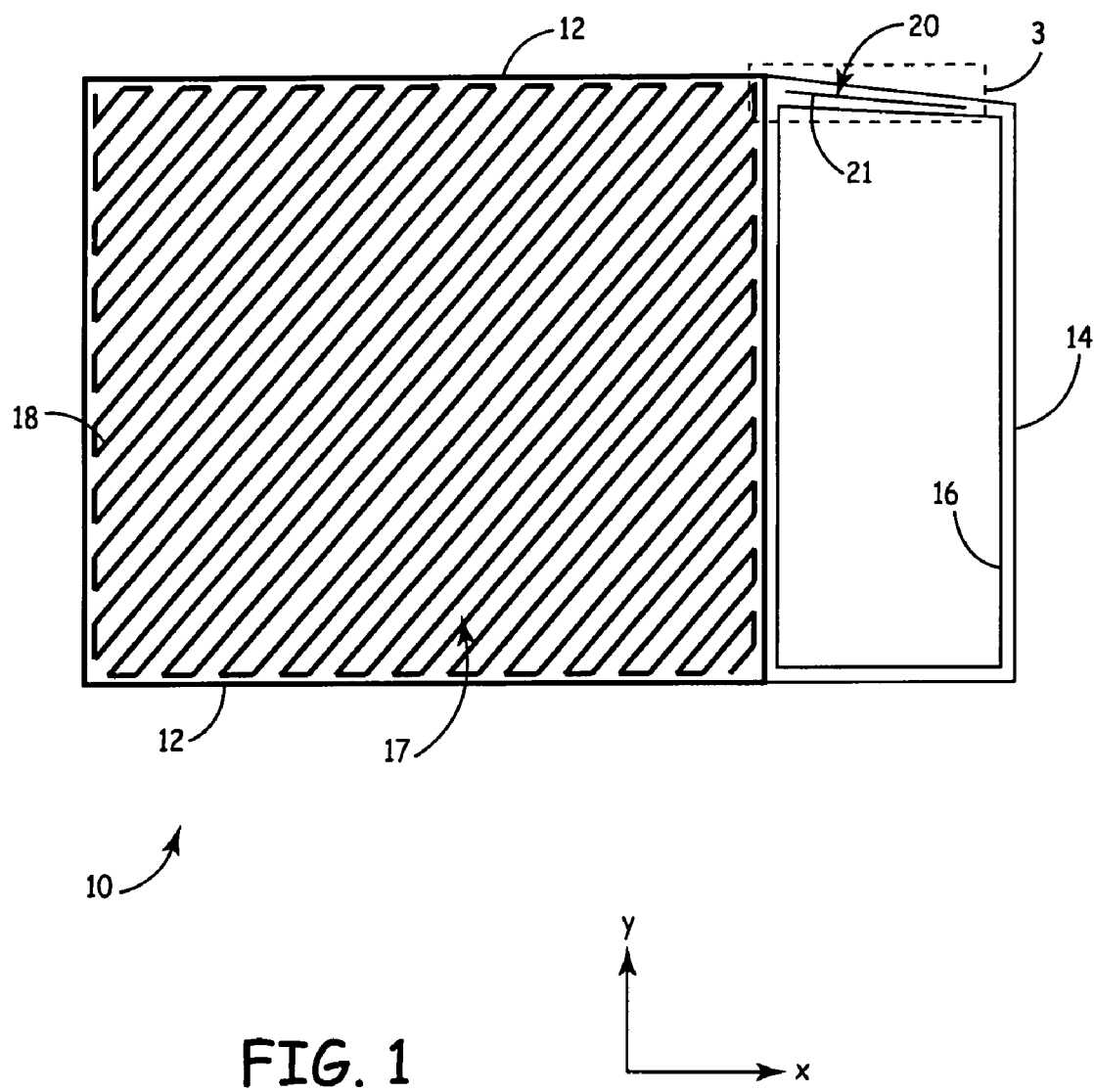
FIG. 1 is a top view of a build path generated by a host computer for building a layer of a 3D object pursuant to a method of the present invention.

FIG. 1 is a top view of build path 10, which is an example of build data generated by a host computer for building a layer of a 3D object in an x-y plane, pursuant to the method of the present invention. As discussed below, the method of the present invention is effective for generating build data that accommodates a variety of build designs, particularly designs containing small void regions, and void regions that have varying void widths.

Build path 10 includes perimeter paths 12, 14, and 16, bulk raster region 17, bulk raster path 18, void region 20, and remnant path 21. Perimeter paths 12 and 14 are generated vector patterns that define exterior boundaries of build path 10. Perimeter path 16 is a generated vector pattern opposite of perimeter paths 12 and 14, which defines an interior boundary of build path 10. When generating perimeter paths 12, 14, and 16, the host computer identifies the dimensions of the current layer and creates vector patterns for depositing roads of build material based on a "first road width resolution".

The first road width resolution corresponds to a standard road width of the deposited roads of build material used to build the 3D object. Examples of standard road widths for building the 3D object range from about 250 micrometers (about 10 mils) to about 1,020 micrometers (about 40 mils). The first road width resolution is desirably held constant to allow the road heights of the deposited roads to be constant, thereby providing a substantially uniform layer thickness.

Bulk raster region 17 is a region defined by perimeter path 12, in which bulk raster path 18 is generated. Bulk raster path 18 is a raster pattern based on the first road width resolution and is particularly suitable for filling a large region of the layer within bulk raster region 17 (i.e., within the boundaries of perimeter path 12). The host computer determines the direction of bulk raster path 18 (i.e., the direction of the corresponding raster legs) based on the layer being formed, which preferably rotates between each layer to improve the strength of the resulting 3D object.

Void region 20 is a location between perimeter paths 12, 14, and 16 that is too small to generate a perimeter path or a bulk raster path based on the first road width resolution. Moreover, the void width of void region 20 (taken along the y-axis) decreases generally along the x-axis when viewed from left-to-right in FIG. 1. If void region 20 is left unfilled, the resulting 3D object will contain a corresponding cavity disposed between the deposited roads of build material. As such, to correct this issue, the host computer generates remnant path 21 pursuant to the method of the present invention to fill void region 20.

As discussed below, remnant path 21 has a road width that varies with the void width of void region 20. This is in contrast to the substantially uniform road widths of perimeter paths 12, 14, and 16, and bulk raster path 18, which are based on the first road width resolution. As build material is deposited along on remnant path 21, the amount of build material deposited decreases while the extrusion head moves from left-to-right generally along the x-axis in FIG. 1. This substantially fills the area corresponding to void region 20 between perimeter paths 12, 14, and 16.

Figure 2:
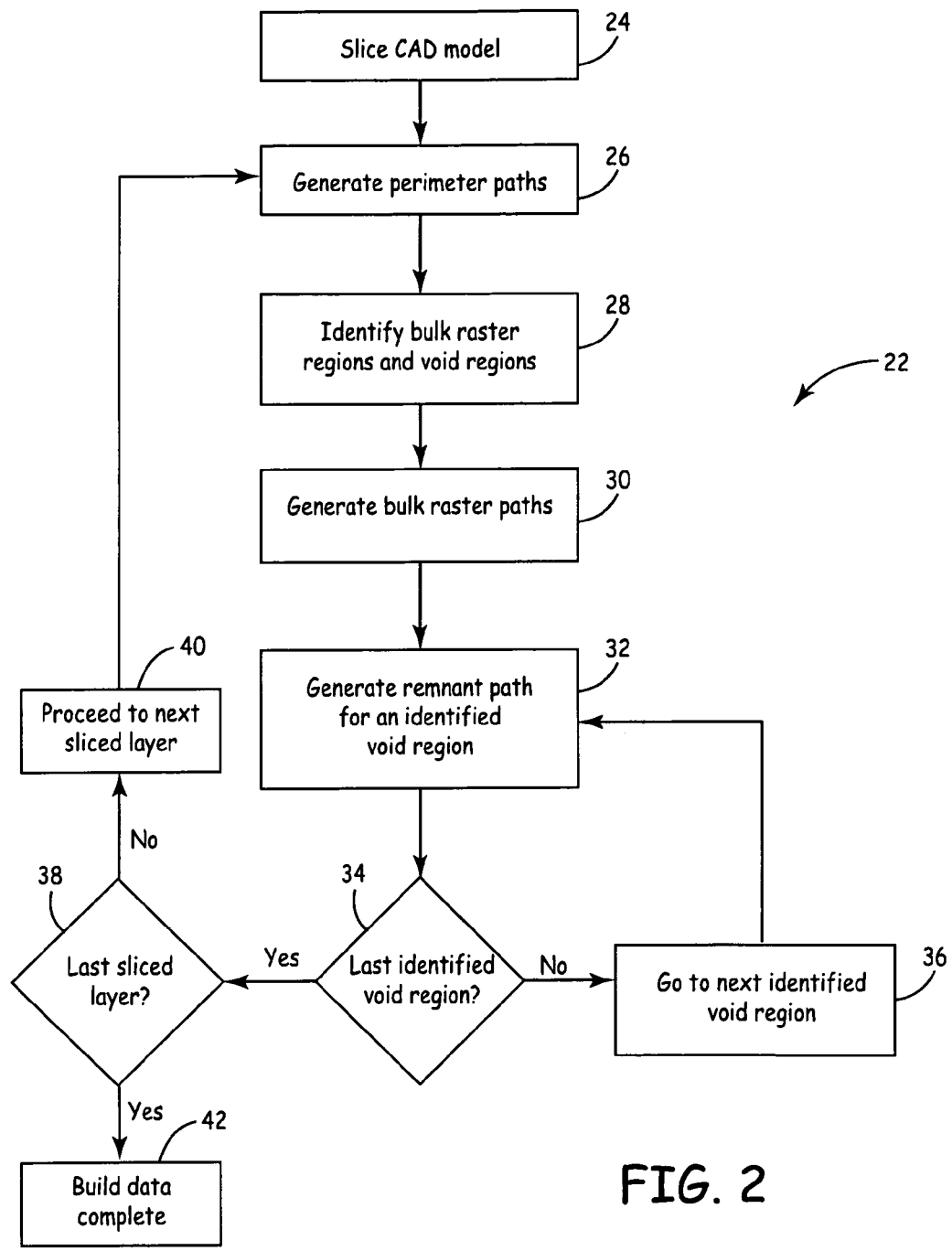
FIG. 2 is a block diagram illustrating a method of the present invention for generating build data using remnant paths to fill void regions located within build paths.

FIG. 2 is a block diagram illustrating method 22 of the present invention, which is a suitable method for generating build data using remnant paths to fill void regions located within build paths. The disclosure of method 22 is made with reference to build path 10 in FIG. 1 with the understanding that method 22 is applicable to a variety of build data designs. Method 22 includes steps 24-42, in which the host computer initially divides the CAD model into multiple sliced layers (step 24). Perimeter paths 12, 14, and 16 are then generated for the first sliced layer (step 26), which define the interior and exterior boundaries of build path 10 for the layer.

The host computer then searches the layer and identifies bulk raster regions (e.g., bulk raster region 17) and void regions (e.g., void region 20) located within perimeter paths 12, 14, and 16 based on a set of predefined dimensions (step 28). The predefined dimensions for identifying bulk raster regions and void regions are desirably mutually exclusive. For example, interior regions of the given layer that have areas equal to or larger than a predefined area value are identified as bulk raster regions, and interior regions that have areas less than the predefined area are identified as void regions. Preferably, the predefined dimensions allow the host computer to identify void regions having areas within perimeter paths 12, 14, and 16 that are smaller than the first road width resolution. Such void regions would otherwise be ignored and remain unfilled by paths generated based on the first road width resolution. With regards to build path 10, the host computer identifies bulk raster region 17 as a bulk raster region within perimeter path 12, and also identifies void region 20 as a void region located between perimeter paths 12, 14, and 16.

After the bulk raster regions and void regions are identified, the host computer may then generate bulk raster paths (e.g., bulk raster path 18) to fill the bulk raster regions (e.g., bulk raster region 17) (step 30). After the bulk raster paths are generated, the host computer may then generate a remnant path (e.g., remnant path 21) in an identified void region (step 32). Generation of remnant path 21 initially involves generating an intermediate path (not shown) within void region 20, and then generating remnant path 21 based on the intermediate path. As discussed below, the intermediate path is used to calculate a plurality of void widths along void region 20, and remnant path 21 is then generated based at least in part on the calculated void widths. This allows remnant path 21 to have a road width that varies with the dimensions of void region 20.

After the remnant path is generated for the identified void region, the host computer may check whether there are any additional void regions to be filled (step 34). If so, the host computer goes to the next void region (step 36) and creates a remnant path for that void region in the same manner as discussed above. Steps 32-36 are desirably repeated until all of the identified void regions for the given layer contain generated remnant paths.

Once remnants paths have been generated for the identified void regions, the host computer may examine whether the given layer is the last sliced layer of the 3D object (step 38). If not, the host computer may then proceed to the next sliced layer (step 40) and repeat steps 26-40 for each successive sliced layer. This creates build data for each sliced layer, where remnant paths are generated in identified void regions of each sliced layer. When the last sliced layer is completed, the build data is complete, and is ready for submission to a deposition system for building the 3D object (step 42).

In alternative embodiments of method 22, steps 28-36 may be performed in any order or in parallel, so long as the generation of a remnant path (step 32) in a given void region occurs after the given void region is identified (step 28). For example, the generation of bulk raster paths (step 30) may be performed after all of the remnant paths have been generated (steps 32-36). However, steps 28-36 generally require the generation of the perimeter paths (step 26), since the subsequent steps rely on the dimensions of the perimeter paths. Moreover, additional steps of identifying void regions and generating corresponding remnant paths may be performed after the bulk raster paths have been generated in step 30. For example, a second predetermined dimension may be used to identify smaller void regions within bulk raster region 17 and/or perimeter paths 12, 14, and 16. As such, method 22 may also be used to generate remnant paths within void regions located between a perimeter path (e.g., raster path 12) and an adjacent bulk raster path (e.g., bulk raster path 18).

Figure 3:
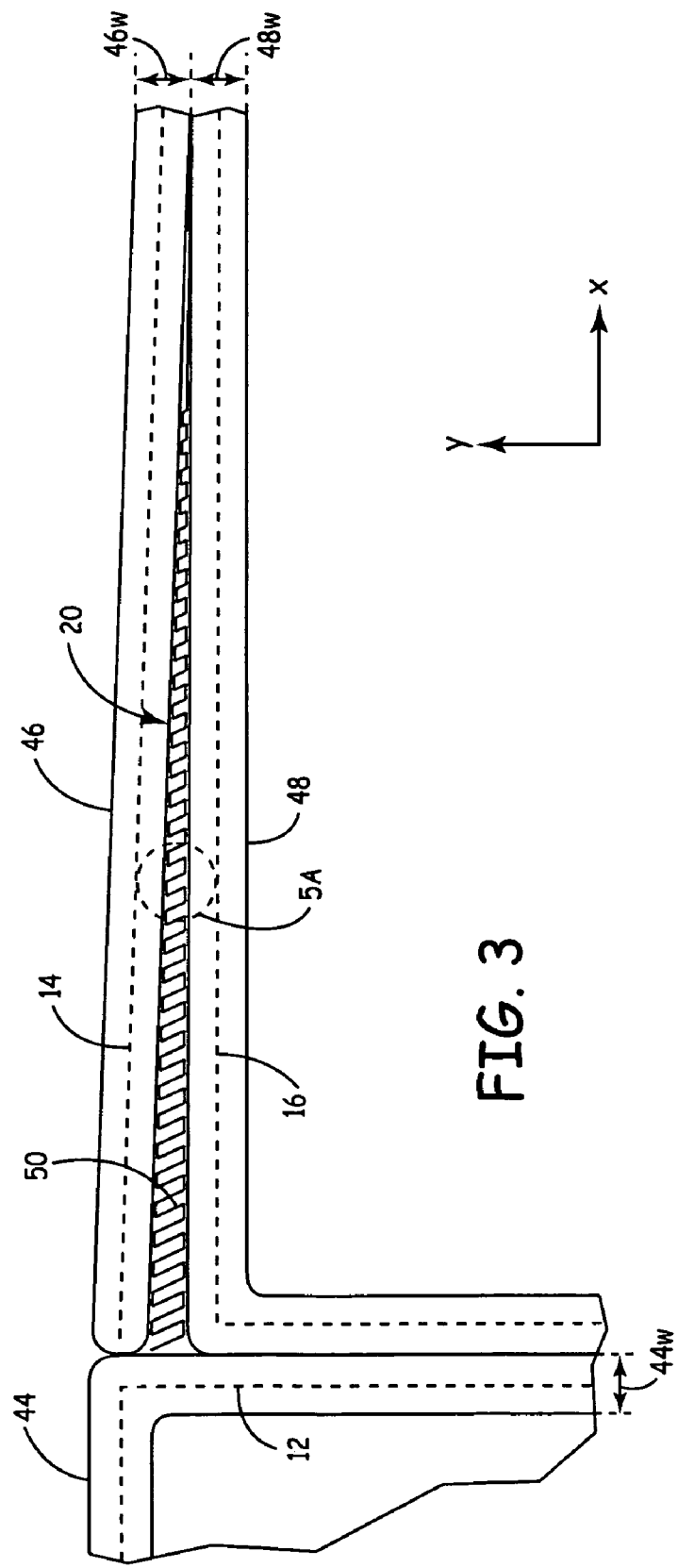
FIG. 3 is an expanded view of section 3 taken in FIG. 1.

FIG. 3 is an expanded view of section 3 taken in FIG. 1 (bulk raster path 18 not shown), where void region 20 is disposed between theoretical roads 44, 46, and 48. Theoretical roads 44, 46, and 48 are dimensions corresponding to the physical roads of build material to be deposited, and which are based on the first road width resolution and the respective perimeter paths 12, 14, and 16. As shown, theoretical roads 44, 46, and 48, respectively have road widths 44*w*, 46*w*, and 48*w*, which are centered around the respective perimeter paths 12, 14, and 16.

Because perimeter paths 12, 14, and 16 are generated based on the first road width resolution, road widths 44*w*, 46*w*, and 48*w* are substantially the same. As a result, the host computer may identify the areas in the x-y plane that each deposited road of build material will encompass, and properly offset perimeter paths 12, 14, and 16. For example, as shown at the left-side portion of FIG. 3, perimeter path 12 extends parallel to perimeter path 16. Based on the first road width resolution, the host computer may generate perimeter paths 12 and 16 at offset locations such that the theoretical roads 44 and 48 are located adjacent each other without overlapping.

Despite the offsetting of the perimeter paths, the angled arrangement of perimeter paths 14 and 16 forms void region 20. Void region 20 has a plurality of void widths (taken along the y-axis) that vary generally along the x-axis, where even the largest void width (located adjacent theoretical road 44) is smaller than road widths 44*w*, 46*w*, and 48*w* (i.e., less than the first road width resolution). As such, the host computer does not generate a perimeter path or bulk raster path to fill void region 20. Instead, the host computer generates raster path 50 within void region 20, based on a "second road width resolution".

Raster path 50 is an intermediate path used to subsequently generate remnant path 21 pursuant to step 32 of method 22. Raster patterns are particularly suitable for identifying boundaries of theoretical roads (e.g., theoretical roads 44, 46, and 48). As such, raster path 50 may be used to calculate the void widths of void region 20, thereby allowing the host computer to generate remnant path 21 having a road width that varies with the dimensions of void region 20. Alternatively, other types of intermediate paths may be used to calculate the dimensions of void region 20 and generate remnant path 21.

The second road width resolution used to generate raster path 50 is preferably higher than the first road width resolution used to generate perimeter paths 12, 14, and 16, and bulk raster path 18. Terms such as "higher road width resolution" and "a road width resolution that is higher" herein refer to a road width resolution that is finer and more detailed compared to another road width resolution. The higher road width resolution allows the host computer to generate raster paths in void regions that are smaller than the first road width resolution. Examples of suitable road widths for the second road width resolution range from about 50 micrometers (about 2 mils) to about 200 micrometers (about 8 mils).

While raster path 50 could potentially be used to directly fill void region 20, depositing roads of build material based along raster path 50 would be time consuming due to the continuous back-and-forth motions of the extrusion head under the high road width resolution. Moreover, also as discussed above, the road width of deposited build material is dependent on several factors. For example, the road width of a deposited road of build material is generally proportional to the height of the road, which corresponds to the layer thickness. Depositing roads of build material having small road widths will correspondingly decrease the layer thickness of the 3D object along the given road. This will require additional depositions of build material to even out the layer.

Additionally, the size of the extrusion nozzle limits the minimum road width obtainable. Road widths of about 50 micrometers (about 2 mils) to about 200 micrometers (about 8 mils) may be too small for a given deposition system to deposit roads of build material. Therefore, in contrast to perimeters paths 12, 14, and 16, and bulk raster path 18, roads of build material are not deposited based directly on the pattern of raster path 50 (or any alternative intermediate path). Instead, the host computer uses raster path 50 to subsequently generate remnant path 21 having a road width that varies with the dimensions of void region 20.

Figure 4:
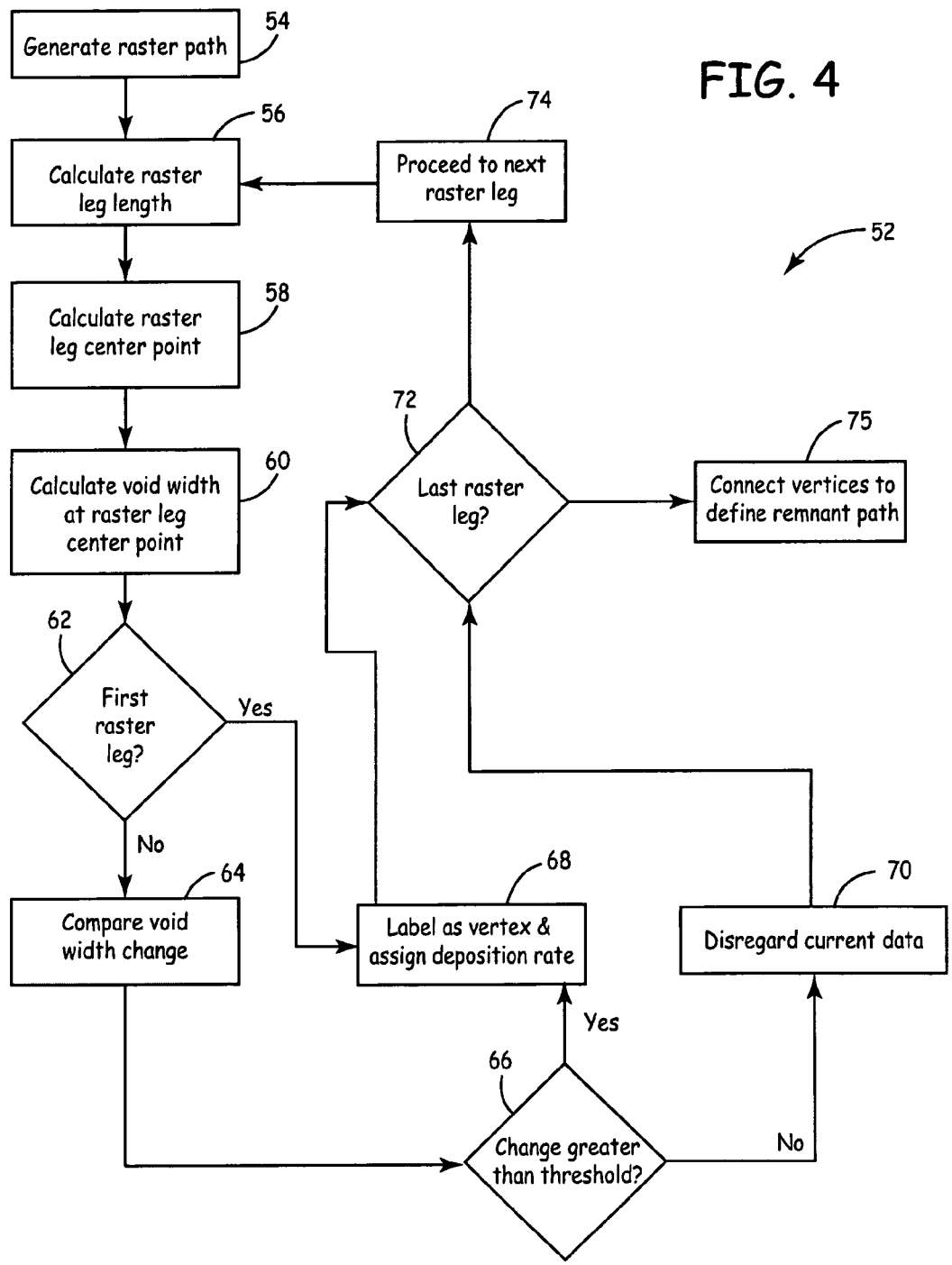
FIG. 4 is a block diagram illustrating a method of the present invention for generating a remnant path in a void region of a build path.

FIG. 4 is a block diagram illustrating method 52, which is a suitable method for generating remnant path 21 in void region 20 pursuant to step 32 of method 22. As shown, method 52 includes steps 54-75, and initially involves generating raster path 50 based on the second road width resolution (step 54). The host computer then uses the raster legs of raster path 50 to determine void widths along void region 20. This involves calculating a raster leg length for a given raster leg of raster path 50 (starting with a first raster leg) (step 56), calculating a raster leg center point of the current raster leg (step 58), and calculating a void width of void region 20 at the raster leg center point (step 60).

The host computer then determines whether the current raster leg is the first raster leg of raster path 50 (step 62). If so, the host computer then labels the raster leg center point as a "vertex" and assigns a deposition rate that is based at least in part on the calculated void width (step 68). If the current raster leg is not the first raster leg of raster path 50, then the host computer compares the calculated void width to a previously calculated void width of the last labeled vertex (step 64). If the change in void widths is greater than a difference threshold (step 66), then the current raster leg center point is labeled as a vertex and is assigned a deposition rate, as discussed above (step 68). If the change in void widths is not greater than the difference threshold (step 66), then the host computer may disregard the calculated data for the current raster leg (step 70).

The host computer then checks whether the current raster leg is the last raster leg of raster path 50 (step 72). If not, the host computer proceeds to the next raster leg of raster path 50 (step 74) and repeats steps 56-74. The continual comparing of void widths along void region 20 is performed to determine whether the change in void widths between successive raster legs varies enough to vary the deposition rate of build material. Vertices are placed at each location along void region 20 where the deposition rates vary, and remnant path 21 is then generated as a vector path that follows the vertices (step 75). An example of method 52 in use is discussed below with reference to FIGS. 5A-5D.

Figure 5A:
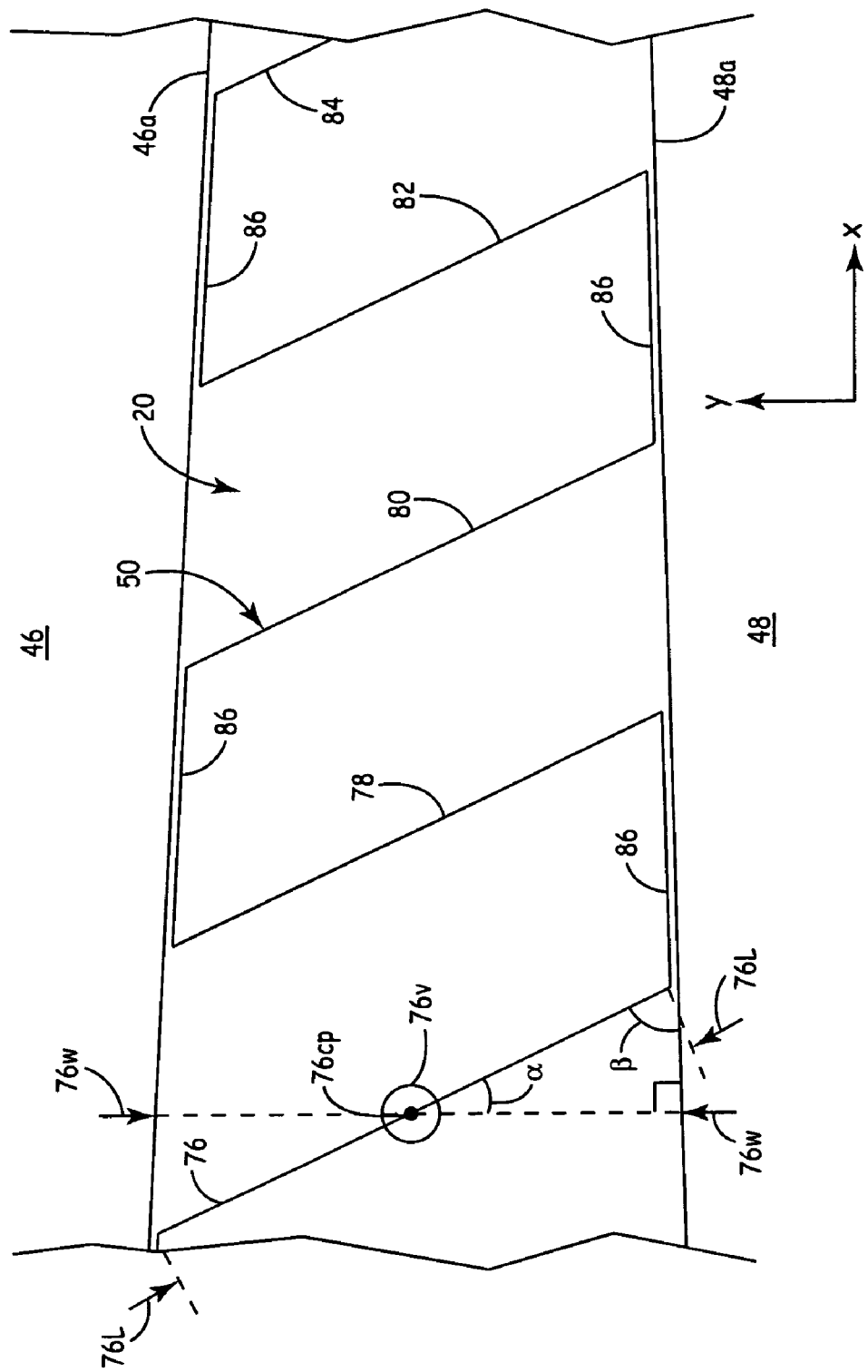
FIGS. 5A-5D are expanded views of section 5A taken in FIG. 3, showing the calculations a host computer may perform to generate a remnant path pursuant to the method of the present invention.

FIGS. 5A-5D are expanded views of section 5A taken in FIG. 3, showing the calculations the host computer may perform to generate remnant path 21 pursuant to method 52. As shown in FIG. 5A, theoretical roads 46 and 48 respectively include walls 46*a* and 48*a*, which are the theoretical borders of void region 20. Void region 20 has a plurality of void widths (taken along the y-axis) that decrease generally along the x-axis when viewed from left-to-right in FIG. 5A. Raster path 50 includes raster legs 76-84 interconnected by junctions 86, where the illustrated locations of raster legs 76-84 and junctions 86 relative to each other and theoretical roads 46 and 48 are exaggerated for ease of discussion.

After raster path 50 is generated, the host computer identifies a first raster leg and calculates the length of the first raster leg between walls 46a and 48a (step 56). While the first raster leg of raster path 50 is located at an end of raster path 50, for ease of discussion, raster leg 76 will be referred to as the first raster leg. Accordingly, based on the generated data of raster path 50, the host computer calculates length 76L of raster leg 76. Based on length 76L, the host computer then calculates center point 76cp of raster leg 76, which is located along raster leg 76 at ½ length 76L from either wall 46a or wall 48a (step 58).

The host computer then calculates void width 76w of void region 20 at a location along the x-axis of center point 76cp (step 60). This may be performed with right-triangle trigonometric principles. For example, as shown in FIG. 5A, the host computer may calculate half of void width 76w (½ void width 76w) by multiplying half of the length of raster leg 76 (½ length 76L) by the cosine of angle α. Angle α=90−angle β, where angle β is based on the direction of raster leg 76 and the direction of wall 48a. Because walls 46a and 48a are angled relative to each other, a perfect right triangle is not obtained. However, because the second road width resolution that raster path 50 is based on is a high resolution, the amount of error incurred is minimal.

Once the calculations of raster leg 76 are complete, the host computer checks whether raster leg 76 is the first raster leg of raster path 50 (step 62). Because raster leg 76 is the first leg of raster path 50, in this example, center point 76cp is labeled as vertex 76v and is assigned a "first deposition rate", where the first deposition rate is based on void width 76w (step 68).

Build data generated for deposition systems typically include a plurality of data points that represent coordinate locations and deposition rates. As such, a typical data point includes an array as follows: (x, y, z, deposition rate), where the x-coordinate and y-coordinate define a location within a given layer at the z-coordinate along the z-axis. Accordingly, the z-coordinates for all data points in a given layer are the same. The deposition rate determines the rate that the deposition system deposits roads of build material, which affects the road heights and road widths of the deposited roads. Accordingly, the first deposition rate assigned to vertex 76v is the deposition rate of build material required to adequately fill void region 20 at a location of vertex 76v, and is proportional to void width 76w.

Because vertex 76v is identified, steps 64 and 66 of method 52 may be correspondingly ignored for raster leg 76. Additionally, the host computer may ignore step 62 (i.e., checking for the first raster leg) for the subsequent raster legs of raster path 50.

Figure 5B:
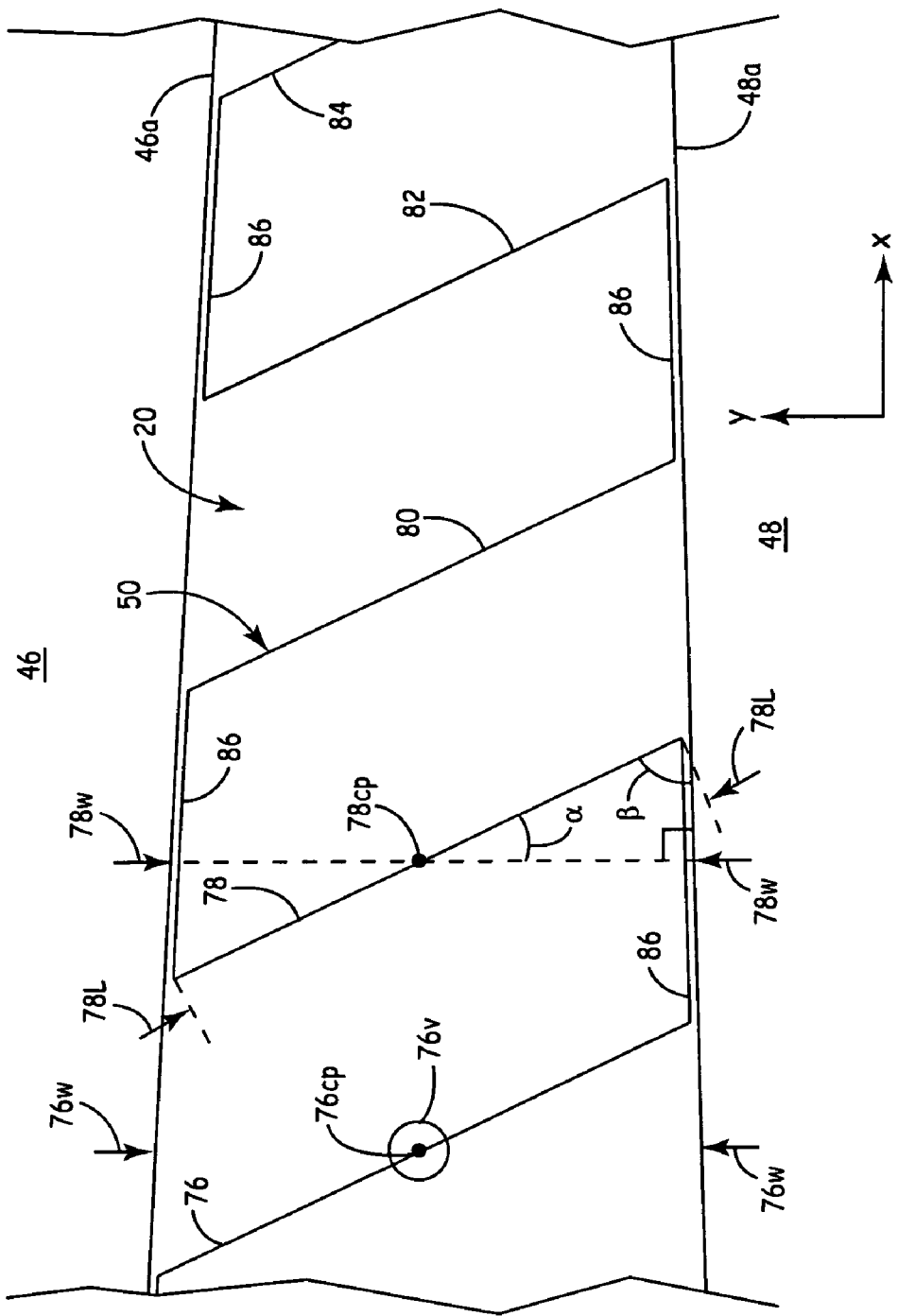

As shown in FIG. 5B, after completing the calculations relating to raster leg 76, the host computer then checks whether raster leg 76 is the last raster leg of raster path 50 (step 72). Because additional raster legs are present, the host computer then proceeds to the next raster leg, which is raster leg 78 (step 74), and performs the same calculations, pursuant to steps 56-60. This provides raster leg length 78L, raster leg center point 78cp, and void width 78w at center point 78cp.

The host computer then compares the void width at the current raster leg center point (i.e., void width 78w) to the void width of the last labeled vertex, which in this example is void width 76w (corresponding to vertex 76v) (step 64). If the absolute value of the difference between void width 76w and void width 78w is greater than a difference threshold (referred to herein as the Δ threshold) (step 66), then center point 78cp would be labeled as a vertex and assigned a "second deposition rate" based on void width 78w (step 68).

The Δ threshold is a preset value that allows the host computer to reduce the amount of data required to generate remnant path 21. The host computer applies a constant deposition rate (i.e., the first deposition rate corresponding to void width 76w) until the change in void widths along void region 20 exceeds the Δ threshold. Examples of suitable changes in void widths for the Δ threshold range from about 13 micrometers (about 0.5 mils) to about 130 micrometers (about 5 mils), with particularly suitable changes ranging from about 25 micrometers (about 1 mil) to about 50 micrometers (about 2 mils). In this example, let us assume that the absolute value of the difference between void width 76w and void width 78w is less than the Δ threshold. As such, center point 78cp is not labeled as a vertex, and the host computer may disregard the calculated data for raster leg 78 (step 70).

Figure 5C:
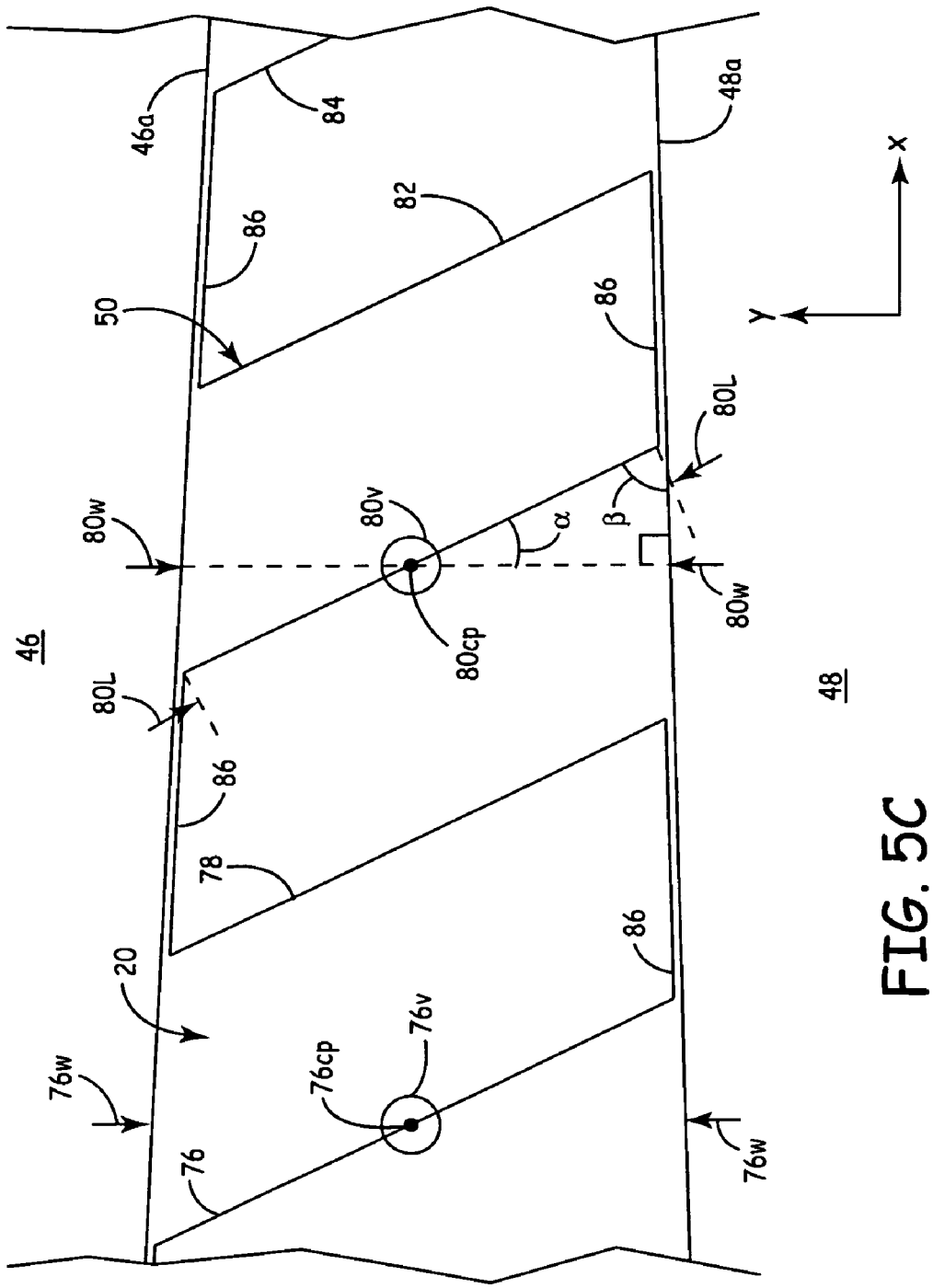

As shown in FIG. 5C, after completing the calculations regarding raster leg 78, the host computer then checks whether raster leg 78 is the last raster leg of raster path 50 (step 72). Because additional raster legs are present, the host computer then proceeds to the next raster leg, which is raster leg 80 (step 74). The host computer then performs the calculations pursuant to steps 56-60 to provide raster leg length 80L, raster leg center point 80cp, and void width 80w at center point 80cp.

Void width 80w is then compared to the void width of the last labeled vertex, which is still void width 76w (corresponding to vertex 76v) (step 64). Here, let us assume that the absolute value of the difference between void width 76w and void width 80w is greater than the Δ threshold (step 66). As a result, center point 80cp is labeled as vertex 80v and assigned a second deposition rate based on void width 80w (step 68).

Similar to the first deposition rate of vertex 76v, the second deposition rate of vertex 80v is the deposition rate of build material required to adequately fill void region 20 at a location of vertex 80v, and is proportional to void width 80w. Accordingly, because the void widths of void region 20 decrease in the positive x-direction, the second deposition rate is less than the first deposition rate. If the deposition rate at vertex 80v remained at the first deposition rate associated with vertex 76v, then an excess amount of build material would undesirably be deposited at vertex 80v. However, to account for the changing dimensions of void region 20, vertices are placed along void region 20 to correspondingly adjust the deposition rates (and deposition directions, as necessary).

Figure 5D:
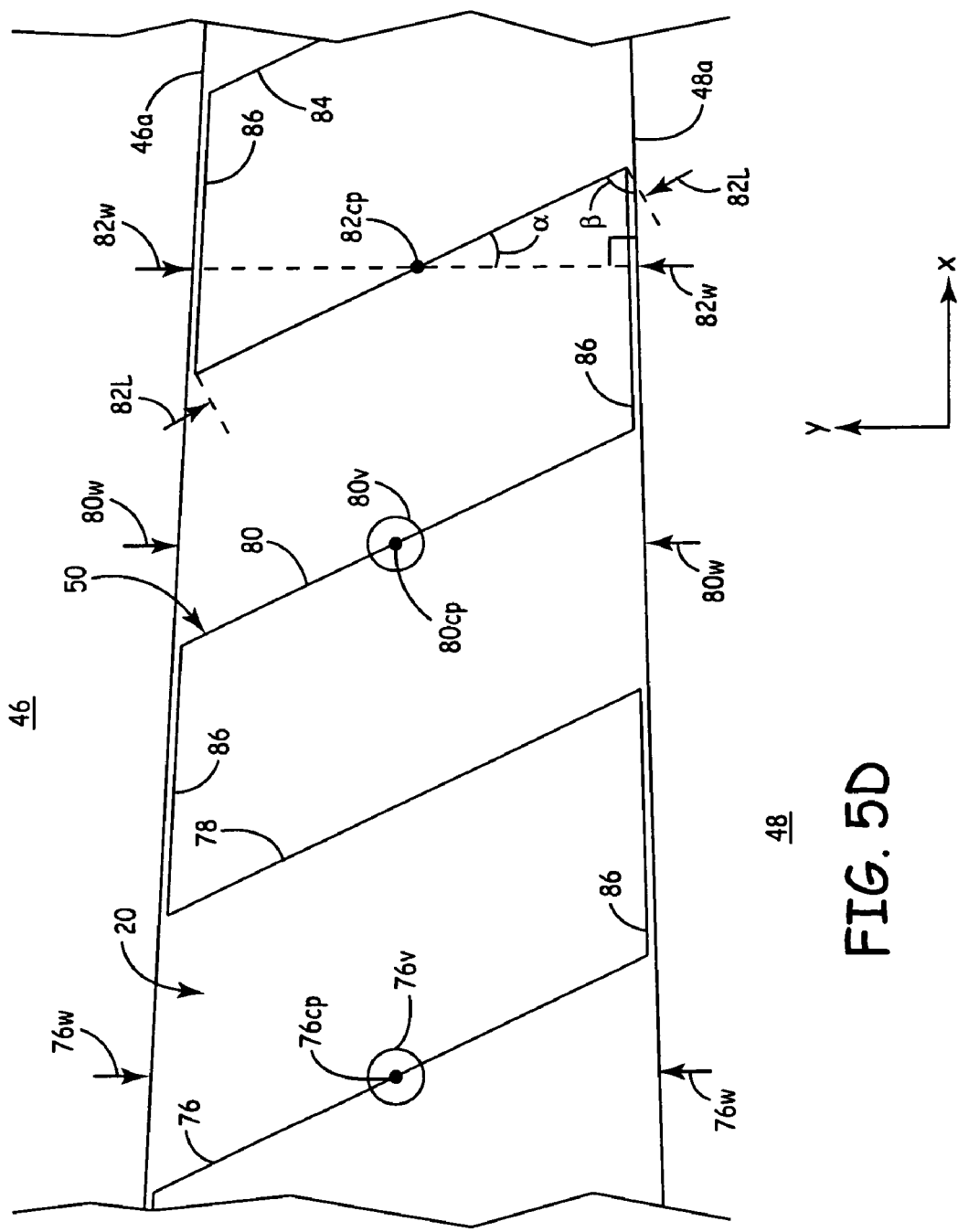

As shown in FIG. 5D, after the host computer completes the calculations regarding raster leg 80, the host computer then checks whether raster leg 80 is the last raster leg of raster path 50 (step 72). Because additional raster legs are present, the host computer then proceeds to the next raster leg, which is raster leg 82 (step 74). The host computer then repeats steps 56-60 for raster leg 82 to provide raster leg length 82L, raster leg center point 82cp, and void width 82w at center point 82cp.

Void width 82w is then compared to the void width of the last labeled vertex, which in this example is now void width 80w (corresponding to vertex 80v) (step 64). For the purposes of illustration and explanation, we will again assume for this example that the absolute value of the difference between void width 80w and void width 82w is less than the Δ threshold (step 66). As such, the host computer does not label center point 82cp as a vertex, and may disregard the calculated data for raster leg 82 (step 70).

Steps 56-74 of method 52 are then repeated until all of the raster legs of raster path 50 (e.g., raster leg 84) are analyzed. When the last raster leg is calculated and compared to the previous vertex raster leg, the host computer then defines remnant path 21 as a vector path that connects the labeled vertices (step 75).

Figure 6:
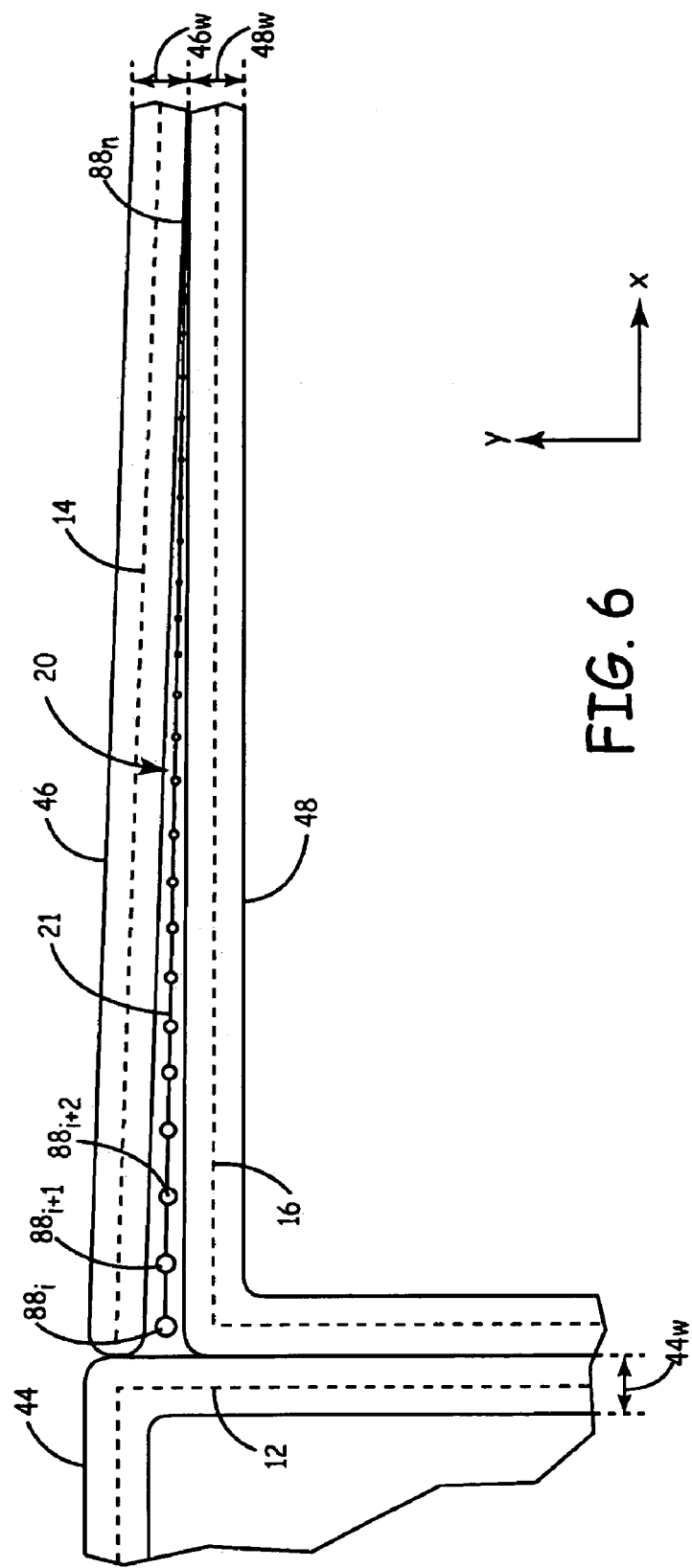
FIG. 6 is a second expanded view of section 3 taken in FIG. 1, where the void region includes a remnant path generated pursuant to the method of the present invention.

FIG. 6 is another expanded view of section 3 taken in FIG. 1, where void region 20 includes remnant path 21 generated pursuant to method 52. Remnant path 21 includes a plurality of vertices $88_i$, $88_{i+1}$, $88_{i+2}$, ..., $88_n$, which are illustrated in FIG. 6 with varying radii for ease of discussion to illustrate the decreasing deposition rates. As discussed above, each vertex includes an array of data in the form of (x, y, z, deposition rate), where the z-coordinate is held constant for a given layer, and the x-coordinate and y-coordinate identify where a given vertex is located. The deposition rate data directs how fast the extrusion head deposits the build material at the given vertex.

The deposition rates of build material may be changed in several manners, and are typically dependent on the deposition system used. For example, for fused deposition modeling systems, the deposition rate may be decreased by decreasing the extrusion rate of the build material, increasing the rate of movement of the extrusion head, or a combination thereof.

As shown in FIG. 6, the deposition rates at vertices $88_i$, $88_{i+1}$, $88_{i+2}$, ..., $88_n$ decrease generally along the x-axis in accordance with the decreasing void widths of void region 20. As a result, build material is deposited along remnant path 21 with decreasing deposition rates generally along the x-axis. For example, starting with vertex $88_i$, the extrusion head moves toward vertex $88_{i+1}$ and deposits build material at the first deposition rate. When vertex $88_{i+1}$ is reached, the extrusion head continues to move toward vertex $88_{i+2}$, but deposits build material at the second deposition rate, which is less than the first deposition rate. This continues until vertex $88_n$ is reached, and void region 20 is substantially filled. The decreasing deposition rates reduce the risk of overfilling void region 20 as the void widths decrease generally along the x-axis in this example.

During the extrusion process, roads of build material are deposited along perimeter paths 12, 14, and 16, which have physical road widths corresponding to road widths 44w, 46w, and 48w, respectively. This forms a cavity that corresponds to void region 20. After roads of build material are deposited along perimeter paths 12, 14, and 16, the extrusion head may deposit a road of build material along remnant path 21 at a varying deposition rate.

One particular benefit of the present invention is that the cavity corresponding to void region 20 may be filled based on a road width resolution that is higher than the first road width resolution, without adversely reducing the road height along remnant path 21. Because the cavity corresponding to void region 20 is bordered by deposited roads of build material, the build material deposited along remnant path 21 flows to conform to the dimensions of the bordering roads. The build material then fuses to the bordering roads of build material, thereby filling the cavity corresponding to void region 20, and preserving the substantially uniform layer thickness.

In alternative designs, an identified void region may have an increasing void width. In these cases, the deposition rates would increase between each vertex as the extrusion head moves left-to-right to deposit the road of build material. In other alternative embodiments, the void width of an identified void region may be held constant. In these cases, the remnant path would include a pair of vertices (starting and stopping locations), and the deposition rate would not change between the vertices.

Figure 7:
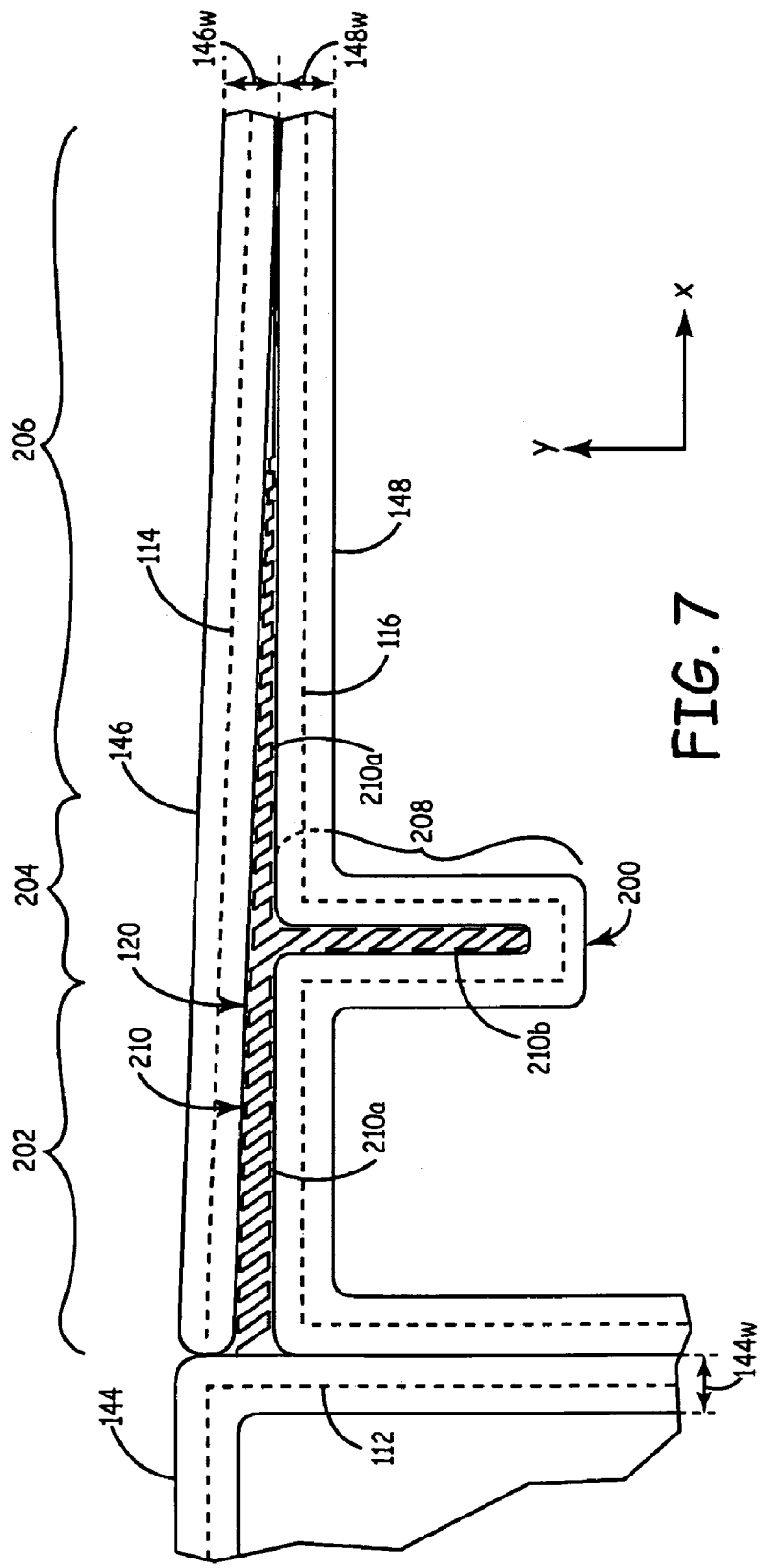
FIG. 7 is a third expanded view of section 3 taken in FIG. 1, showing an alternative void region containing a first intermediate path.
Figure 8:
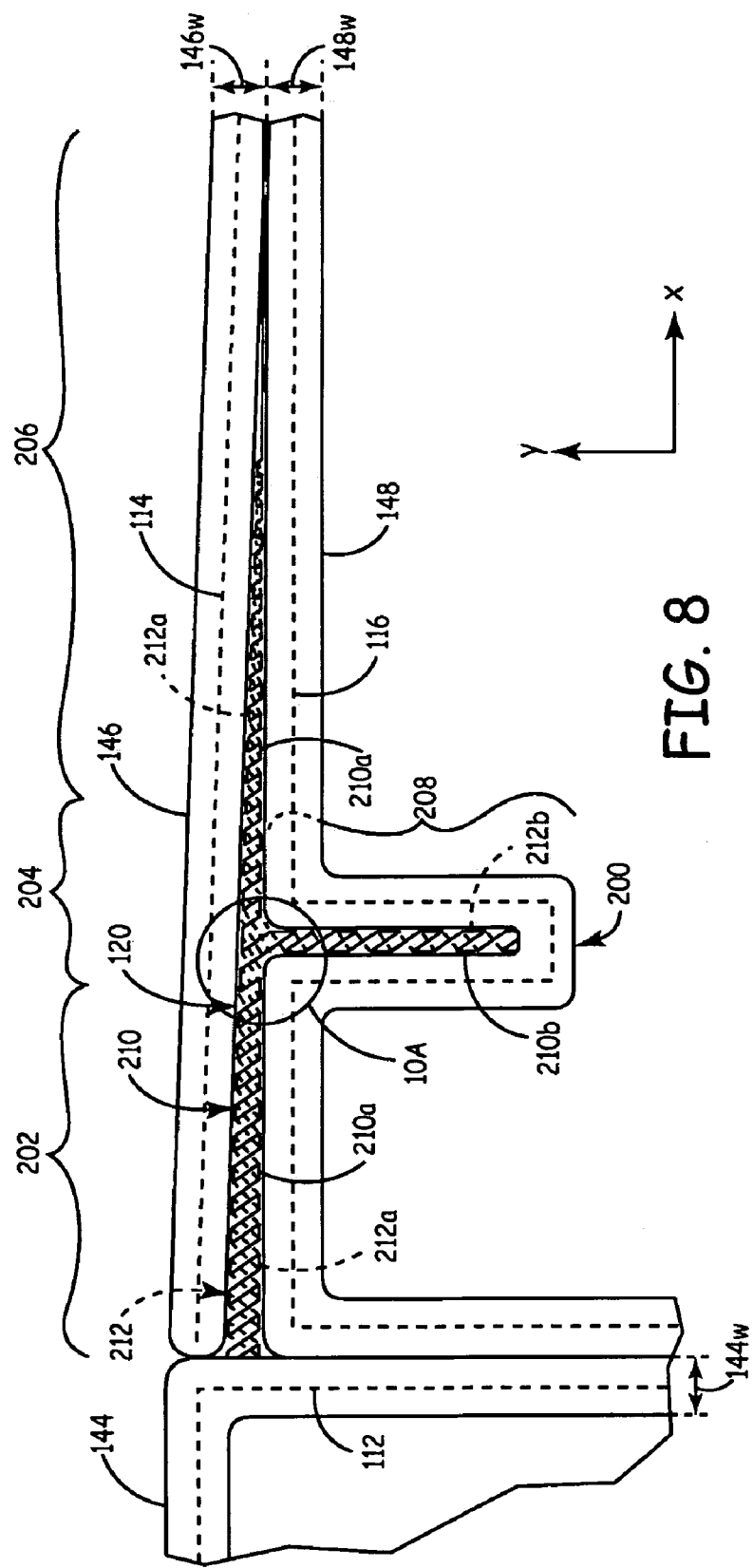
FIG. 8 is a fourth expanded view of section 3 taken in FIG. 1, showing the alternative void region containing a first intermediate path and a second intermediate path.

FIGS. 7 and 8 show alternative expanded views of section 3 taken in FIG. 1, in which void region 20 is replaced by void region 120, and the other respective reference labels are increased by 100. As shown in FIG. 7, void region 120 is disposed between theoretical roads 144, 146, and 148, where road 148 bends to define U-shaped portion 200. Void region 120 includes left arm 202, intersection 204, right arm 206, and branched portion 208, where intersection 204 is the intersecting location of left-arm 202, right arm 206, and branched portion 208. Void region 120 is generally similar to void region 20, except that branched portion 208, defined by U-shaped portion 200, extends generally perpendicular to left arm 202 and right arm 206.

The branched arrangement of void region 120 effectively prevents a single remnant path from adequately filling void region 120. As such, a first remnant path (not shown) may be generated to substantially fill left arm 202, intersection 204, and right arm 206, and a second remnant path (not shown) may then be generated to substantially fill branched portion 208. Accordingly, the present invention may be used to fill void regions having a variety of design dimensions.

To generate one or more remnant paths within void region 120, the host computer may initially generate first raster path 210, which is an intermediate path based on the second road width resolution. As discussed above, the second road width resolution is preferably a higher resolution than the first road width resolution used to generate perimeter paths 114, 116, and 118. This allows first raster path 210 to be generated within void region 120.

Because of the branched arrangement of void region 120, first raster path 210 may be generated as a pair of subpaths, referred to as paths 210a and 210b. Subpath 210a is a raster pattern similar to raster path 50, discussed above in FIG. 3, and extends along left arm 202, intersection 204, and right arm 206, and partially dips into branched portion 208. Then, while identifying the locations of subpath 210a and theoretical road 148, the host computer may generate path 210b to fill in the remaining area of branched portion 208.

The branched arrangement of void region 120 also renders a single raster path unsuitable for generating the remnant paths. First raster path 210 alone is suitable for generating a remnant path in void regions that are linear or that have gradual curvatures (e.g., directional changes of less than about 45 degrees). However, as discussed below, branched portion 208 causes the calculated void widths along a single axis (e.g., the x-axis or the y-axis) to substantially increase at intersection 204. To accommodate for this, the host computer may generate a second raster path to account for the large increases in void widths.

As shown in FIG. 8, second raster path 212 may be generated within void region 120 in a perpendicular direction to first raster path 210 (i.e., the raster legs of second raster path 212 extend perpendicularly to the raster legs of first raster path 210). Second raster path 212 may also be generated as subpaths 212a and 212b. Subpath 212a extends along left arm 202, intersection 204, and right arm 206, and partially dips into branched portion 208. Then, while identifying the locations of subpath 212a and theoretical road 148, the host computer may generate subpath 212b to fill in the remaining area of branched portion 208.

First raster path 210 and second raster path 212 are examples of suitable intermediate paths for subsequently generating remnant paths to substantially fill void region 120. As discussed below, the host computer may use first raster path 210 and second raster path 212 to calculate the dimensions of void width 120 in a similar manner to that discussed above for method 52 in FIG. 4. The host computer may then generate remnant paths having road widths that vary with the dimensions of void width 120.

Figure 9:
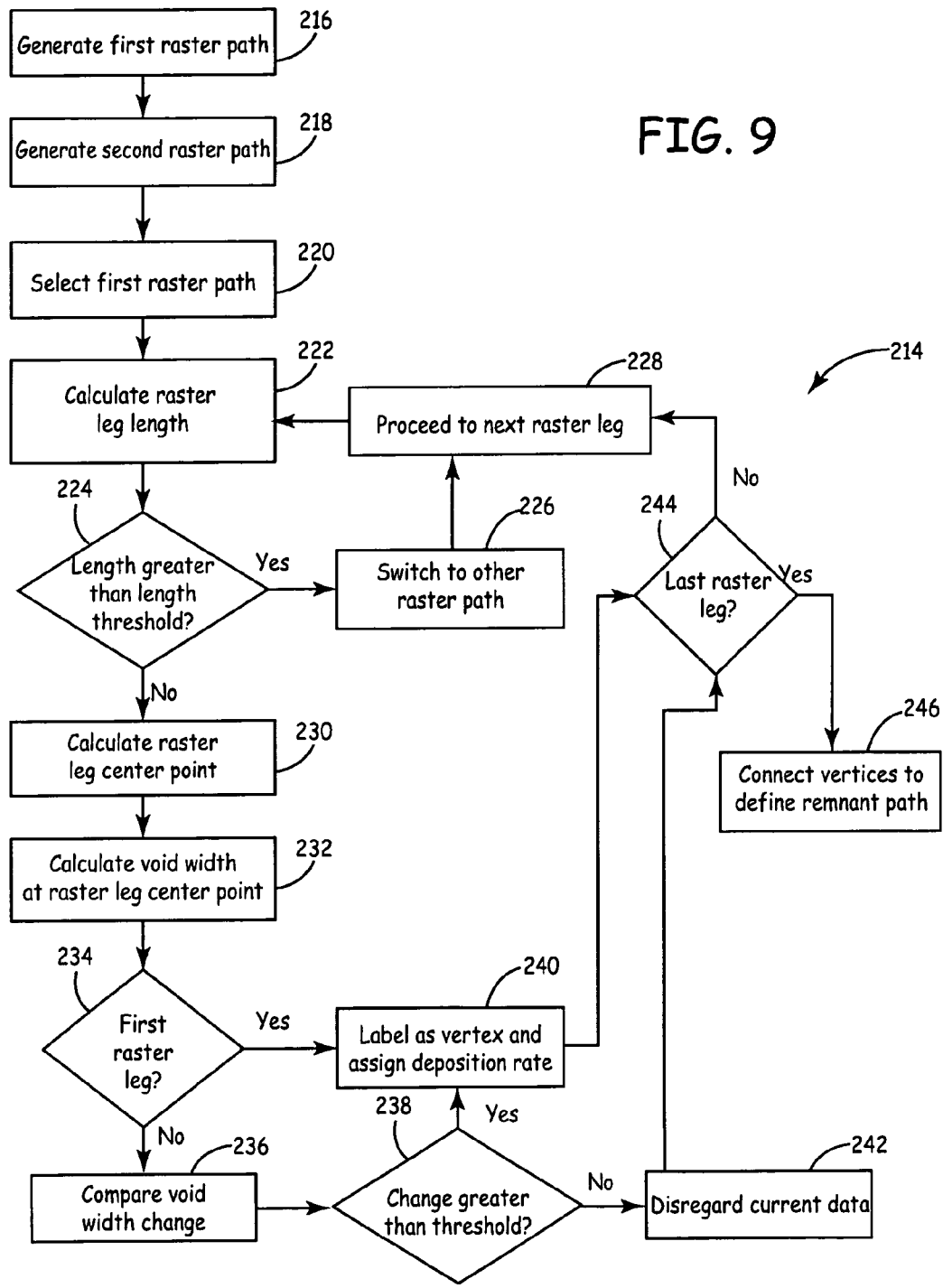
FIG. 9 is a block diagram illustrating an alternative method of the present invention for generating remnant paths.

FIG. 9 is a block diagram illustrating method 214, which is a suitable method for generating a remnant path in void region 120 pursuant to step 32 of method 22. As discussed below, method 214 is particularly suitable for use with void regions that are curved or have branching portions (e.g., void region 120). Method 214 includes steps 216-246, and initially involves generating first raster path 210 and second raster path 212 based on the second deposition resolution (steps 216 and 218).

The host computer then selects first raster path 210 (step 220) to begin calculating the void widths along void width 120. This involves calculating a raster leg length for a given raster leg of first raster path 210 (starting with a first raster leg) (step 222), and determining whether the raster leg length exceeds a length threshold (step 224). The length threshold is used to identify locations along void region 120 when the void widths of void region 120 substantially increase (e.g., at intersection 204 shown in FIG. 8). If the given raster leg length exceeds the length threshold, the host computer switches to second raster leg 212 (step 226) and proceeds to the next raster leg of second raster path 212 (step 228).

If the given raster leg length does not exceed the length threshold, then the host computer continues with first raster path 210, and performs steps 230-242 of method 214 generally in the same manner as steps 58-70 of method 52, discussed above in FIG. 4. The host computer calculates a raster leg center point of the raster leg (step 230) and a void width of void region 120 at the raster leg center point (step 232). The host computer then determines whether the current raster leg is the first raster leg of first raster path 210 (step 234). If so, the host computer then labels the raster leg center point as a vertex and assigns a deposition rate based at least in part on the calculated void width (step 240).

If the current raster leg is not the first raster leg of first raster path 210, then the host computer compares the calculated void width to a previously calculated void width of the last labeled vertex (step 236). If the change in void widths is greater than a difference threshold (step 238), then the current raster leg center point is labeled as a vertex and is assigned a deposition rate, as discussed above (step 240). If the change in void widths is not greater than the difference threshold (i.e., the $\Delta$ threshold) (step 238), then the host computer may disregard the calculated data for the current raster leg (step 242), except for the calculated raster leg center point. As discussed below, the calculated raster leg center point may be subsequently relied upon when switching between raster paths in step 226.

The host computer then checks whether the current raster leg is the last raster leg of first raster path 210 (step 244). If not, the host computer proceeds to the next raster leg of first raster path 210 (step 228) and repeats steps 222-244. The continual comparing of void widths along void region 120 is performed to determine whether the change in void widths between successive raster legs varies enough to vary the deposition rate of build material. Additionally, the host computer may switch between first raster path 210 and second raster path 212 to more accurately define the void widths of void region 120. Vertices are placed at each location along void region 120 where the deposition rates vary, and a remnant path (not shown) is then generated as a vector path that follows the path of the vertices (step 246). An example of method 214 in use is discussed below with reference to FIGS. 10A-10H.

Figure 10A:
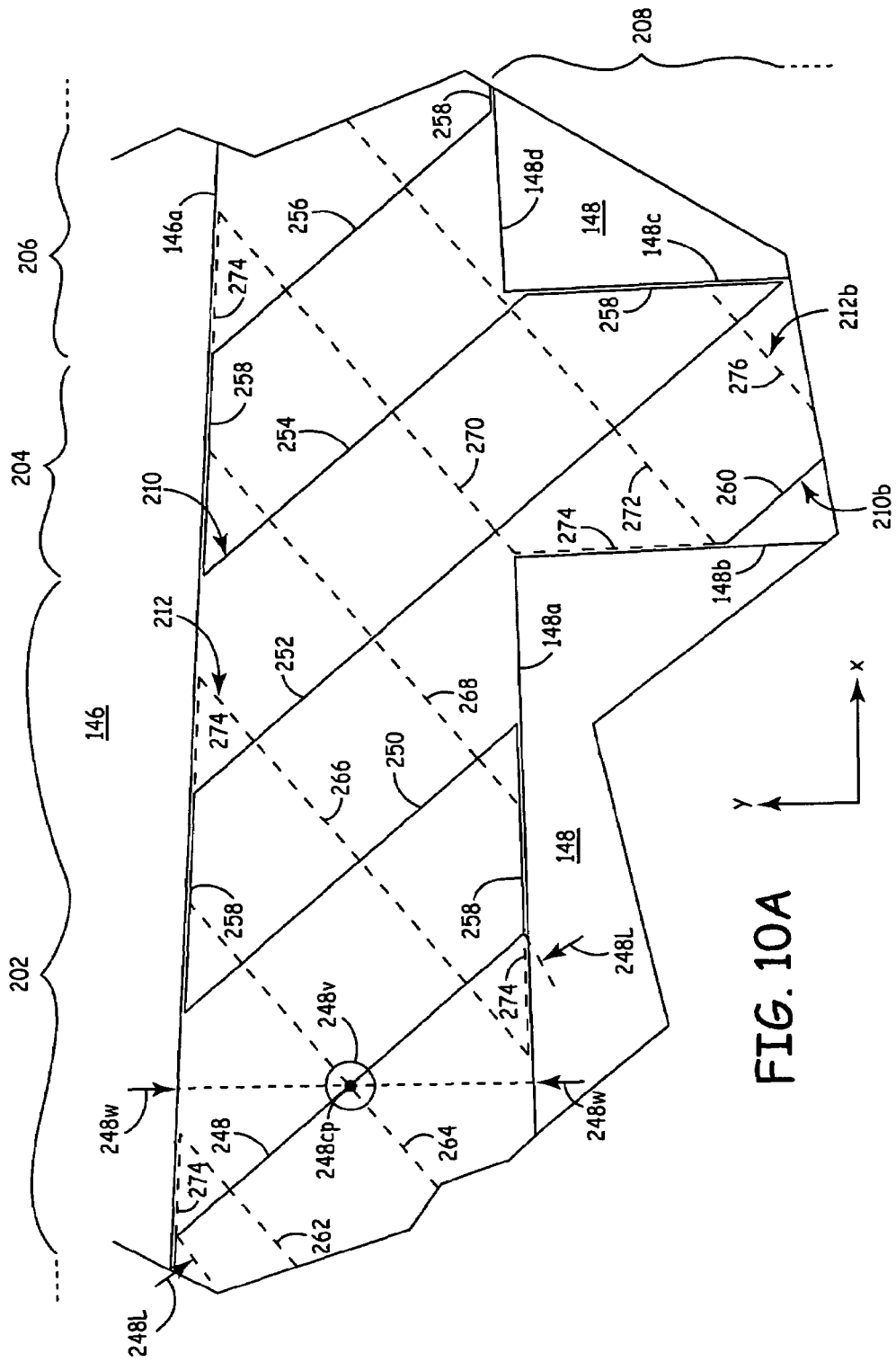
FIGS. 10A-10H are expanded views of section 10A taken in FIG. 8, showing the calculations a host computer may perform to generate remnant paths pursuant to the alternative method of the present invention.

FIGS. 10A-10H are expanded views of section 10A taken in FIG. 8, showing the calculations the host computer may perform to generate a remnant path pursuant to method 214. As shown in FIG. 10A, theoretical road 146 includes wall 146a, and theoretical road 148 includes walls 148a-148d, which are the predicted borders of void region 120. First raster path 210 includes raster legs 248-256 interconnected by junctions 258, and raster leg 260, which is generated by a second path (i.e., subpath 210b) to be co-linear with raster leg 250. Similarly, second raster path 212 includes raster legs 262-272 interconnected by junctions 274, and raster leg 276, which is generated by a second path (i.e., subpath 212b). The illustrated locations of raster legs 248-256, 260-272, and 276, and junctions 258 and 274, relative to each other and roads 146 and 148 are exaggerated for ease of discussion.

After first raster path 210 and second raster path 212 are generated, the host computer selects first raster path 210 (step 220), and then identifies and calculates the length of the first raster leg between walls 146a and 148a. Similar to the discussion above, while the first raster leg of raster path 210 is actually located at an end of raster path 210 in FIGS. 7 and 8, for ease of discussion, raster leg 248 will be referred to as the first raster leg. Accordingly, based on the generated data of raster path 210, the host computer calculates length 248L of raster leg 248 (step 222).

The host computer then checks whether length 248L is greater than a length threshold (step 224). The length threshold is a predetermined value used to identify substantial changes in the void widths of void region 120. Substantial changes in void widths typically occur at branching locations (e.g., intersection 204) or with substantial curvatures of the given void region. As discussed below, the length threshold allows the host computer to identify when to switch to between first raster path 210 and second raster path 212 to accurately define remnant paths within void region 120. Examples of suitable values for the length threshold range from about 130 micrometers (i.e., about 5 mils) to about 760 micrometers (i.e., about 30 mils).

In this example, let us assume that length 248L does not exceed the length threshold. The host computer then calculates center point 248cp of raster leg 248 (step 230). The host computer then calculates void width 248w of void region 120 at a location along the x-axis of center point 248cp (step 232). The calculations of center point 248cp and void width 248w may be performed in the same manner as for steps 58 and 60 of method 52, discussed above in FIG. 5A.

Once the calculations of raster leg 248 are complete, the host computer checks whether raster leg 248 is the first raster leg of first raster path 210 (step 234). Because raster leg 248 is the first leg of first raster path 210 in this example, center point 248cp is labeled as vertex 248v and is assigned a first deposition rate based on void width 248w (step 240). Similar to the discussion above for steps 68 of method 52 in FIG. 5A, the first deposition rate assigned to vertex 248v is the deposition rate of build material required to adequately fill void region 120 at a location of vertex 248v, and is proportional to void width 248w.

Because vertex 248v is identified, steps 236 and 238 of method 214 may be correspondingly ignored for raster leg 248. Additionally, the host computer may also ignore step 234 (i.e., checking for the first raster leg) for the subsequent raster legs of first raster path 210.

Figure 10B:
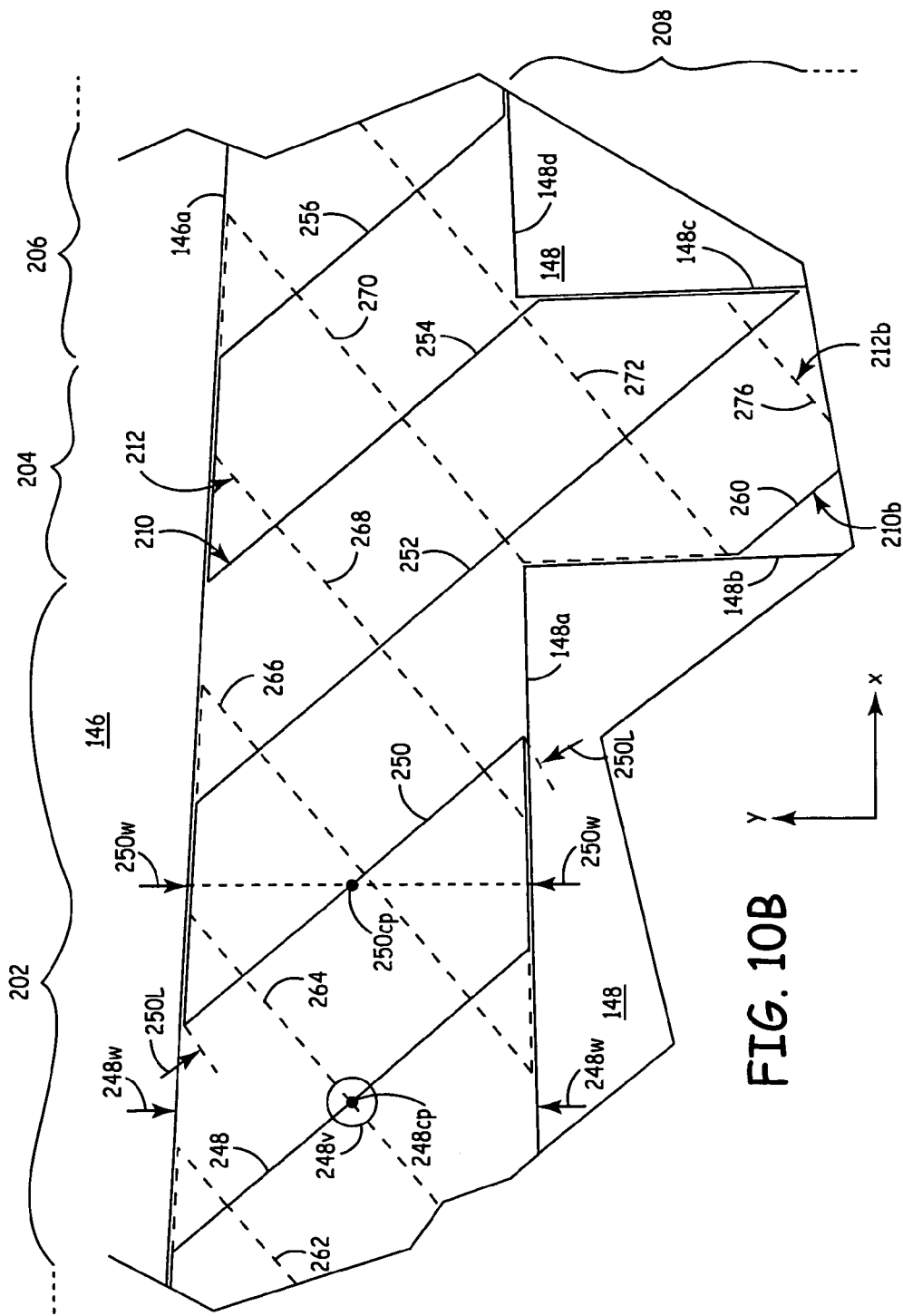

As shown in FIG. 10B, after the host computer completes the calculations relating to raster leg 248, the host computer then checks whether raster leg 248 is the last raster leg of first raster path 210 (step 244). Because additional raster legs are present, the host computer then proceeds to the next raster leg of first raster path 210, which is raster leg 250 (step 228), and calculates length 250L of raster leg 250 (step 222). The host computer then checks whether length 250L is greater than the length threshold (step 224). In our example, because length 250L is less than length 248L, we may also assume that length 250L does not exceed the length threshold. The host computer then calculates center point 250cp of raster leg 250 (step 230) and void width 250w at center point 250cp (step 252).

The host computer then compares the void width at the current raster leg center point (i.e., void width 250w) to the void width of the last labeled vertex, which in this example is void width 248w (corresponding to vertex 248v) (step 236). If the absolute value of the difference between void width 250w and void width 248w is greater than the Δ threshold (step 238), then center point 250cp would be labeled as a vertex and assigned a second deposition rate based on void width 250w (step 240). The Δ threshold used in step 238 is the same as that disclosed above in step 66 of method 52 in FIG. 5B.

In this example, let us assume that the difference between void width 250w and void width 248w is less than the Δ threshold. As such, center point 250cp is not labeled as a vertex, and the host computer may disregard calculated data relating to length 250L and void width 250w for raster leg 250 (step 242). However, as discussed below, the host computer retains data regarding the last center point of the last raster leg analyzed, which in this example is center point 250cp.

Figure 10C:
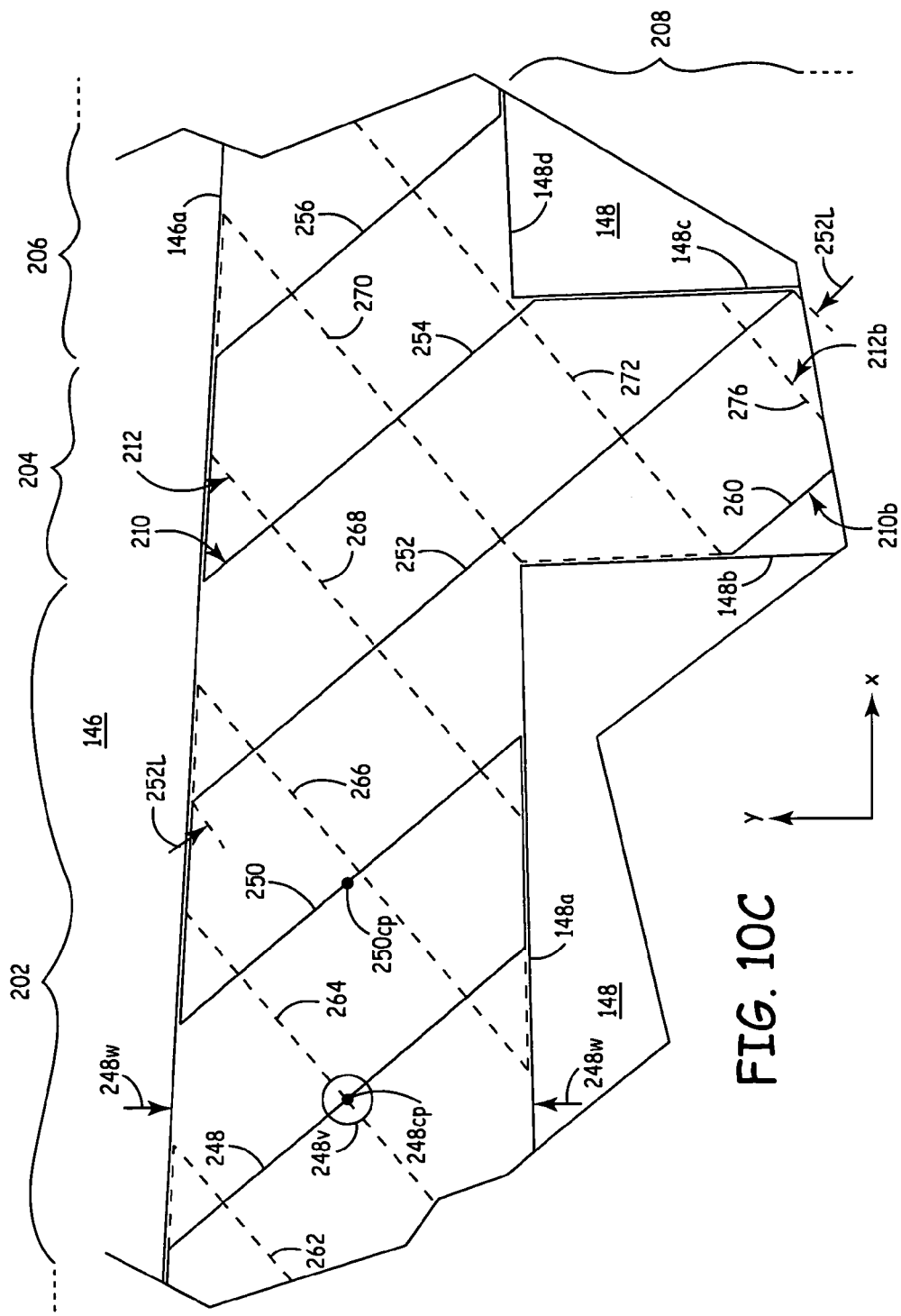

As shown in FIG. 10C, after completing the calculations regarding raster leg 250, the host computer then checks whether raster leg 250 is the last raster leg of first raster path 210 (step 226). Because additional raster legs are present, the host computer then proceeds to the next raster leg of first raster path 210, which is raster leg 252 (step 228). The host computer then calculates length 252L of raster leg 252 (step 222) and checks whether length 252L is greater than the length threshold (step 224).

As shown, raster leg 252 extends from left arm 202, through intersection 204, and into branching portion 208. Accordingly, length 252L is substantially greater than lengths 248L and 250L of the preceding raster legs 248 and 250. This is a particular situation in which the length threshold is used to identify substantial increases in void widths of void region 120. If raster leg 252 is used, the void width of void region 120 calculated from raster leg 252 will be substantially greater than void widths 248w and 240w. This is a result of the branched nature of void region 120. Therefore, in this example we may assume that length 252L exceeds the length threshold. The host computer may then disregard raster leg 252 and switch to second raster path 212 (step 226) to continue the calculations under method 214.

While relying on second raster path 212, the host computer then proceeds to the next raster leg of second raster path 212 that is closest to the last calculated center point in the positive x-direction (i.e., the direction of the subsequent raster legs), which in this example is center point 250cp (step 228). This is the reason why data regarding the center points (e.g., center point 250cp) are not disregarded in step 242. In this example, the closest raster leg of second raster path 212 in the positive x-direction is raster leg 266.

Figure 10D:
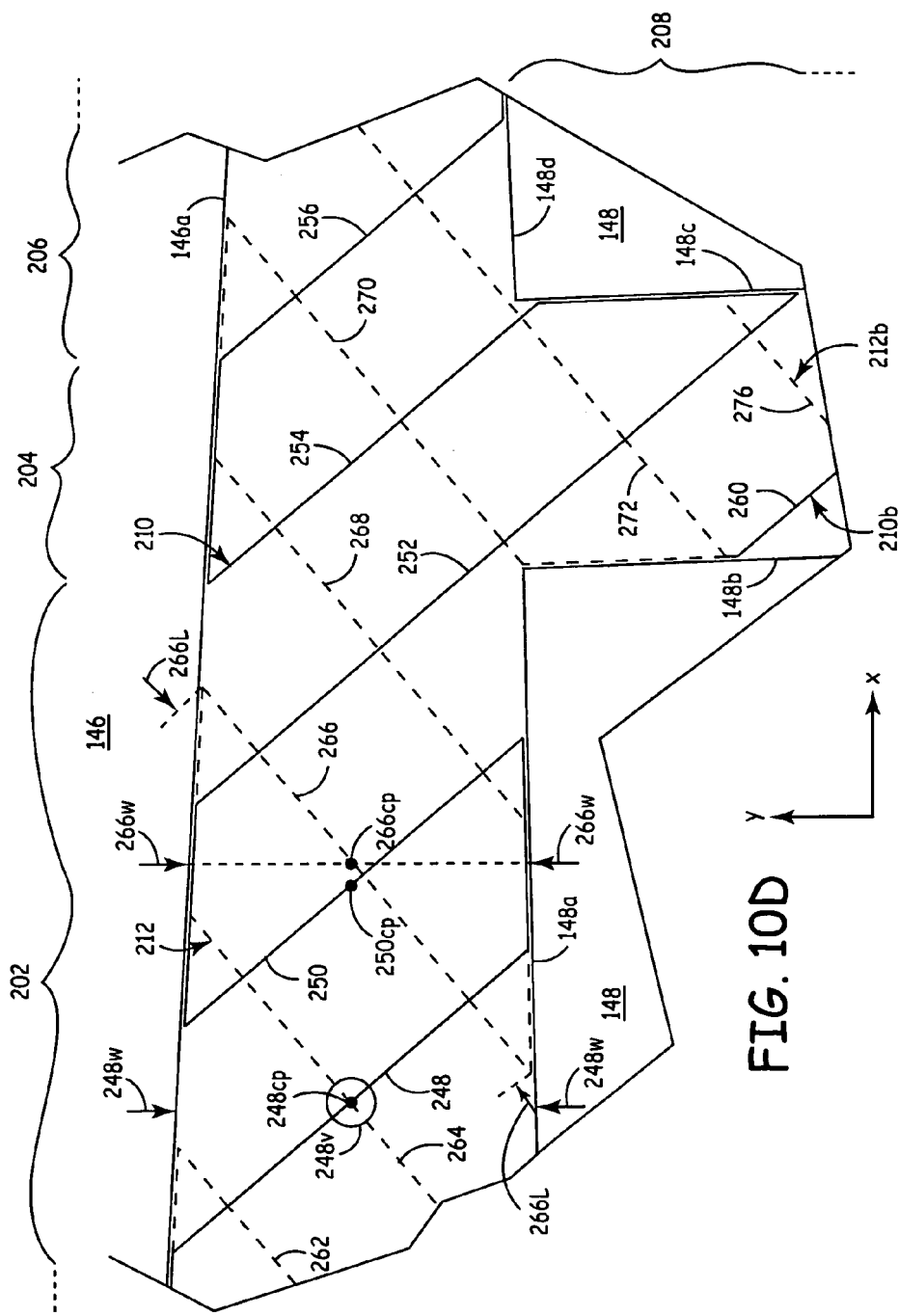

As shown in FIG. 10D, the host computer then calculates length 266L of raster leg 266 (step 222), and checks whether length 266L is greater than the length threshold (step 224). In this example let us assume that length 266L also does not exceed the length threshold (length 266L is similar in magnitude to length 250L). Therefore, the host computer calculates center point 266cp of raster leg 266 (step 230) and void width 266w of void region 120 at center point 266cp (step 252).

The host computer then compares void width 266w to the void width of the last labeled vertex, which in this example is void width 248w (corresponding to vertex 248v) (step 236). In this case, void width 266w is similar to void width 248w, and the absolute value of the difference between void width 266w and void width 248w is less than the Δ threshold. As such, center point 266cp is not labeled as a vertex, and the host computer may disregard data relating to length 266L and void width 266w for raster leg 266. However, the host computer retains data relating to center point 266cp (step 242).

Figure 10E:
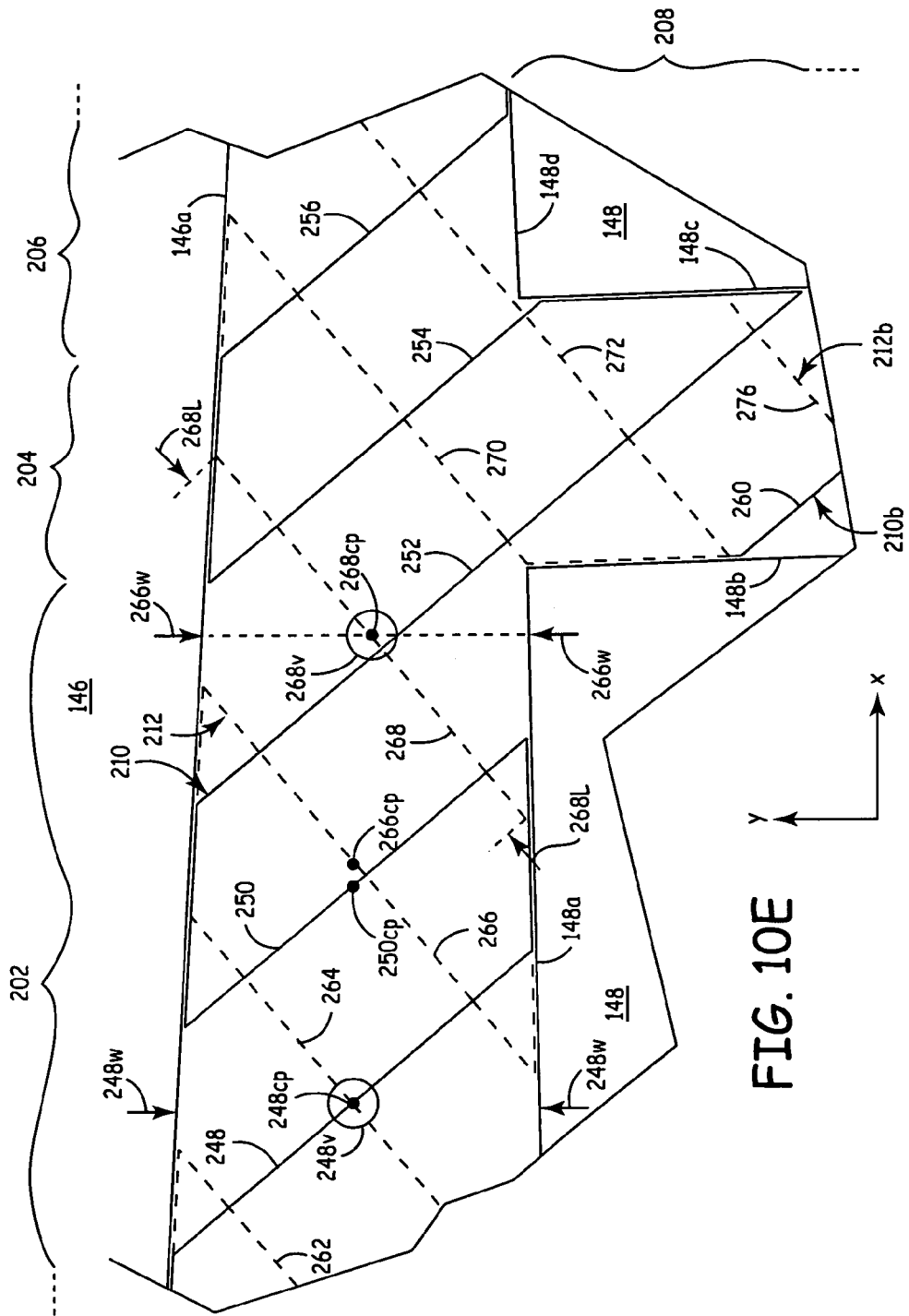

As shown in FIG. 10E, after completing the calculations regarding raster leg 266, the host computer then checks whether raster leg 266 is the last raster leg of second raster path 212 (step 226). Because additional raster legs are present, the host computer proceeds to the next raster leg, which is raster leg 268 (step 228). The host computer then calculates length 268L of raster leg 268 (step 222), and checks whether length 268L is greater than the length threshold (step 224). Here, let us again assume that length 268L does not exceed the length threshold (length 268L is similar in magnitude to length 266L). Therefore, the host computer calculates center point 268cp of raster leg 268 (step 230) and void width 268w of void region 120 at center point 268cp (step 252).

The host computer then compares void width 268w to the void width of the last labeled vertex, which in this example is still void width 248w (corresponding to vertex 248v) (step 236). In this case, let us assume that the void width of void region 120 has decreased enough such that the absolute value of the difference between void width 268w and void width 248w is greater than the Δ threshold (step 238). As a result, the host computer labels center point 268cp as vertex 268v and assigns vertex 268v a second deposition rate based on void width 268w (step 240). The second deposition rate of vertex 268v is the deposition rate of build material required to adequately fill void region 120 at a location of vertex 268v, and is proportional to void width 268w.

Figure 10F:
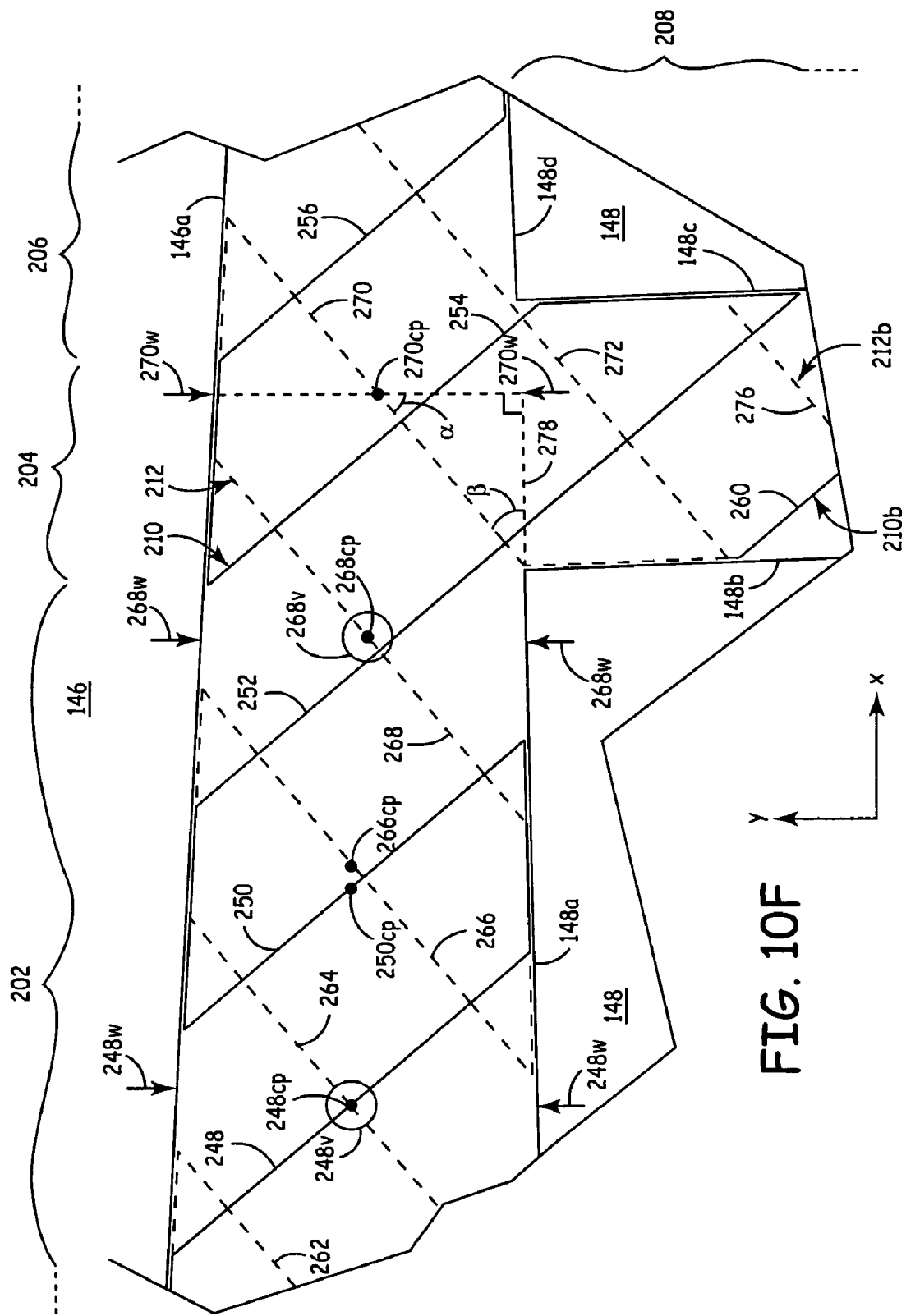

As shown in FIG. 10F, after completing the calculations regarding raster leg 268, the host computer then checks whether raster leg 268 is the last raster leg of second raster path 212 (step 226). The host computer then proceeds to the next raster leg, which is raster leg 270 (step 228). The host computer then calculates length 270L of raster leg 270 (step 222), and checks whether length 270L is greater than the length threshold (step 224).

Here, let us also assume that length 270L does not exceed the length threshold. As such, the host computer calculates center point 270cp of raster leg 270 (step 230) and void width 270w of void region 120 at a location along the x-axis of center point 270cp (step 252). This may also be performed with right-triangle trigonometric principles. As shown in FIG. 10F, the host computer may calculate half of void width 270w (½ void width 270w) by multiply half of the length of raster leg 270 (½ length 270L) by the cosine of angle α. Angle α=90−angle β, where angle β is the angle between raster leg 270 and imaginary wall 278. Imaginary wall 278 extends co-linear with wall 148a from an end point of raster leg 270 adjacent wall 148a.

Because void width 270w is calculated between wall 146a and imaginary wall 278, void width 270w is a void width corresponding to intersection 204, and does not include branched portion 208. Accordingly, as discussed below, a first remnant path may be generated from this initial connection of vertices to fill void region 120 along left arm 202, intersection 204, and right arm 206. A second remnant path may then be generated to fill branched portion 208.

Once center point 270cp and void width 270w are calculated, the host computer then compares void width 270w to the void width of the last labeled vertex, which in this example is now void width 268w (corresponding to vertex 268v) (step 236). Let us assume that the absolute value of the difference between void width 270w and void width 268w is less than the Δ threshold. As such, center point 270cp is not labeled as a vertex, and the host computer may disregard data relating to length 270L and void width 270w for raster leg 270. However, the host computer retains data relating to center point 270cp (step 242).

Figure 10G:
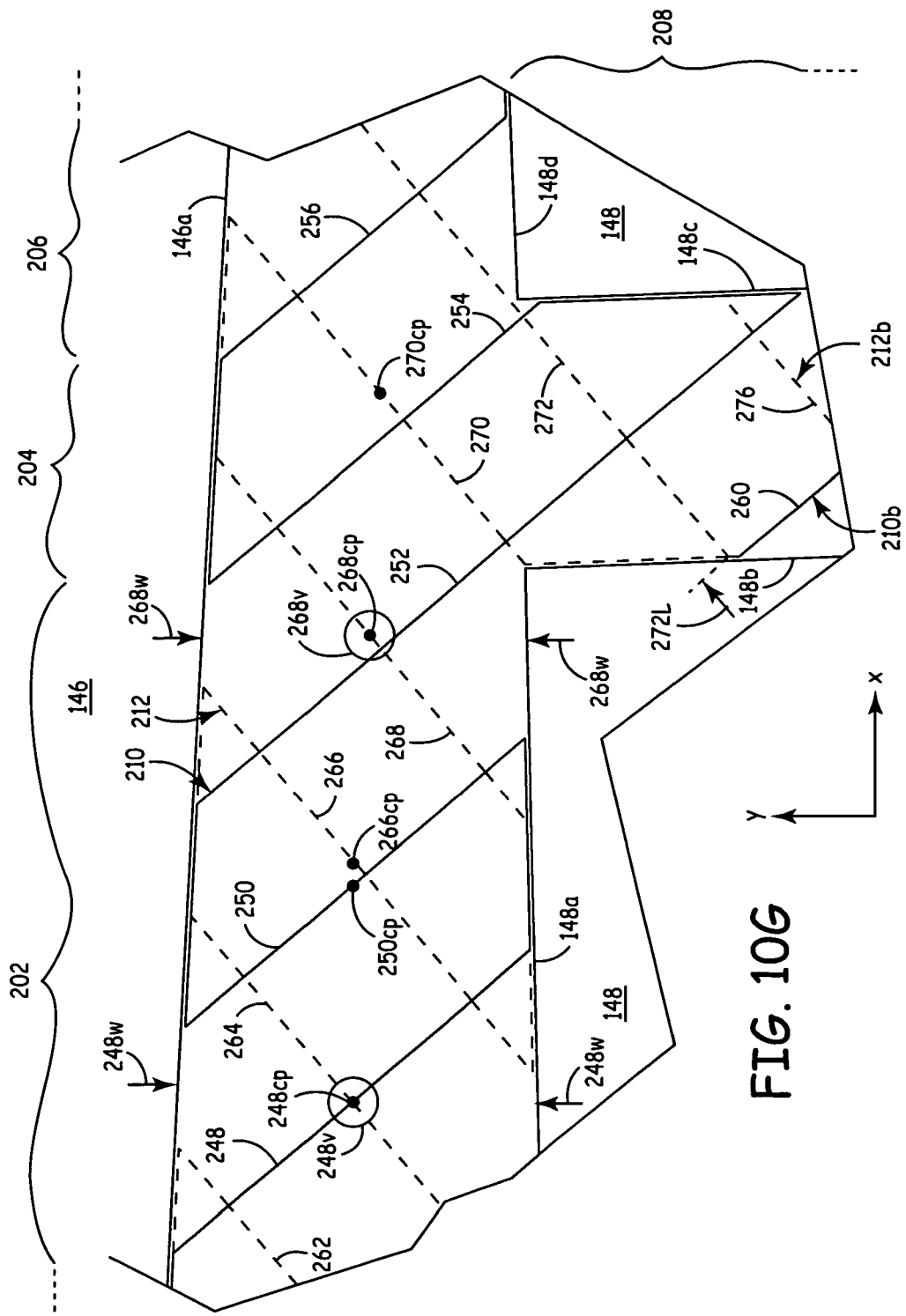

As shown in FIG. 10G, the host computer then checks whether raster leg 270 is the last raster leg of second raster path 212 (step 226). The host computer then proceeds to the next raster leg, which is raster leg 272 (step 228). The host computer then calculates length 272L of raster leg 272 (step 222), and checks whether length 272L is greater than the length threshold (step 224).

As shown, raster leg 272 extends from branching portion 208, through intersection 204, and into right arm 206. Accordingly, length 272L is substantially greater than lengths 268L and 270L of the preceding raster legs 268 and 270. This again is a particular situation in which the length threshold is used to identify substantial increases in void widths of void region 120. If raster leg 272 is used, the void width of void region 120 calculated from raster leg 272 will be substantially greater than void widths 268w and 270w. Therefore, in this example, length 272L also exceeds the length threshold. The host computer may then disregard raster leg 272 and switch back to first raster path 210, continuing to move in a positive x-direction, (step 226) to continue the calculations under method 214.

While relying on first raster path 210, the host computer proceeds to the next raster leg of first raster path 210 that is closest to the last calculated center point in the positive x-direction, which in this case is center point 270cp (step 228). Accordingly the closest raster leg of first raster path 210 in the positive x-direction is raster leg 256.

Figure 10H:
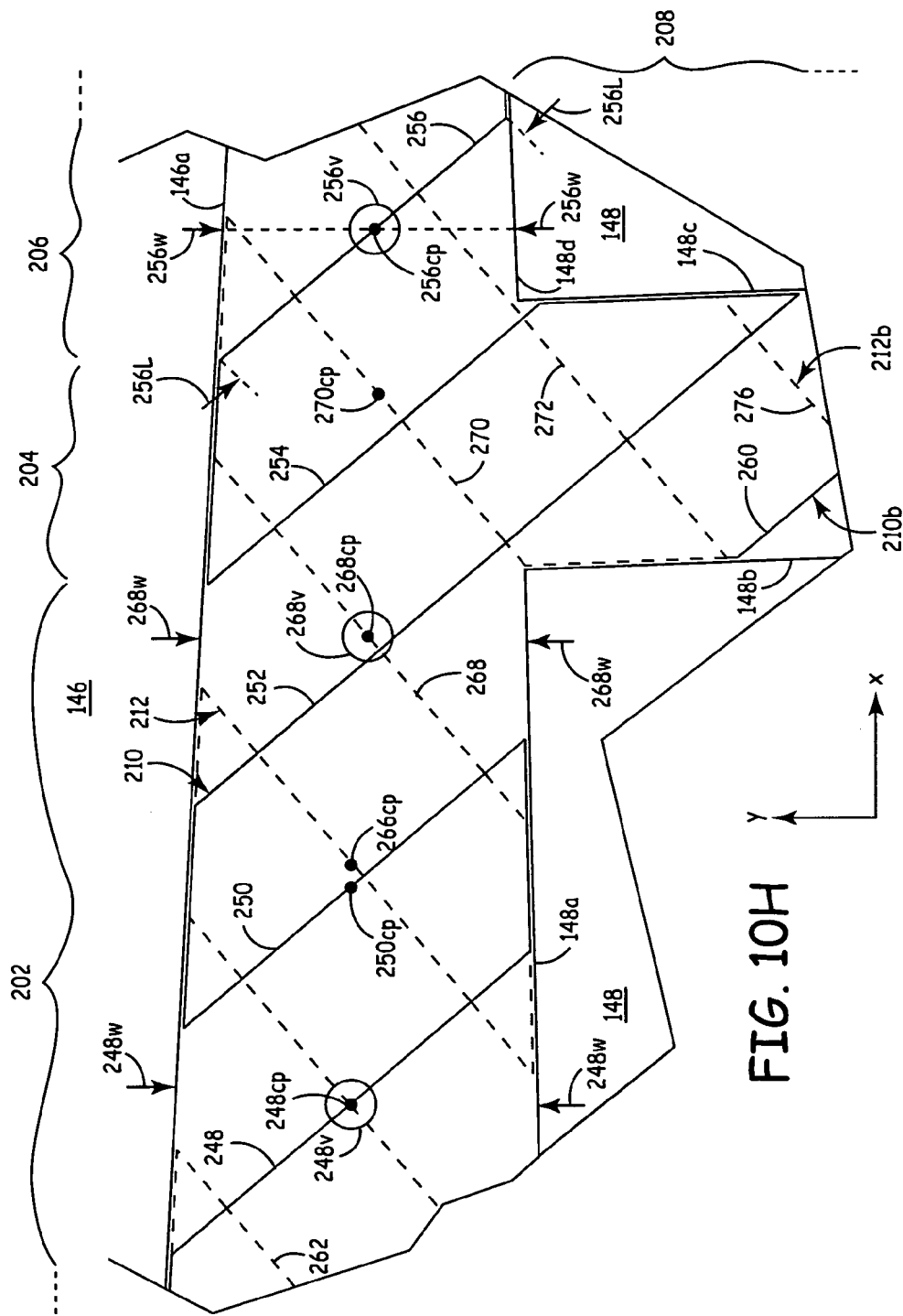

As shown in FIG. 10H, the host computer then calculates length 256L of raster leg 256 (step 222), and checks whether length 256L is greater than the length threshold (step 224). In this example, let us assume that length 256L also does not exceed the length threshold. Therefore, the host computer calculates center point 256cp of raster leg 256 (step 230) and void width 256w of void region 120 at center point 256cp (step 252).

The host computer then compares void width 256w to the void width of the last labeled vertex, which is still void width 268w (corresponding to vertex 268v) (step 236). Here, let us assume that the void width of void region 120 has decreased enough such that the absolute value of the difference between void width 256w and void width 268w exceeds the Δ threshold (step 239). As a result, the host computer labels center point 256cp as vertex 256v and assigns vertex 256v a third deposition rate based on void width 256w (step 240). The third deposition rate of vertex 256v is the deposition rate of build material required to adequately fill void region 120 at a location of vertex 256v, and is proportional to void width 256w.

Steps 222-244 may then be repeated until all of the raster legs of either first raster path 210 or second raster path 212 are analyzed. In this example, because there are no further branching locations in right arm 206, the host computer will continue to analyze and compare raster legs from first raster path 210 until the last raster leg of first raster path 210 is analyzed. When the last raster leg is calculated and compared to the previous vertex raster leg, the host computer then defines the first remnant path as a vector path that connects the labeled vertices (step 246). Accordingly, the first remnant path will extend through left arm 202, intersection 204, and right arm 206, and does not extend into branched portion 208.

Method 214 may then be repeated for branched portion 208 to define the second remnant path that extends generally along the y-axis until intersection 204 is reached. In this case, the void widths of void region 120 at branched portion 208 extend along the x-axis between walls 148b and 148c. Following along with this concept, method 214 may be repeated as many times as necessary to generate remnant paths to substantially fill branching or curved portions of void regions having a variety of designs.

Figure 11:
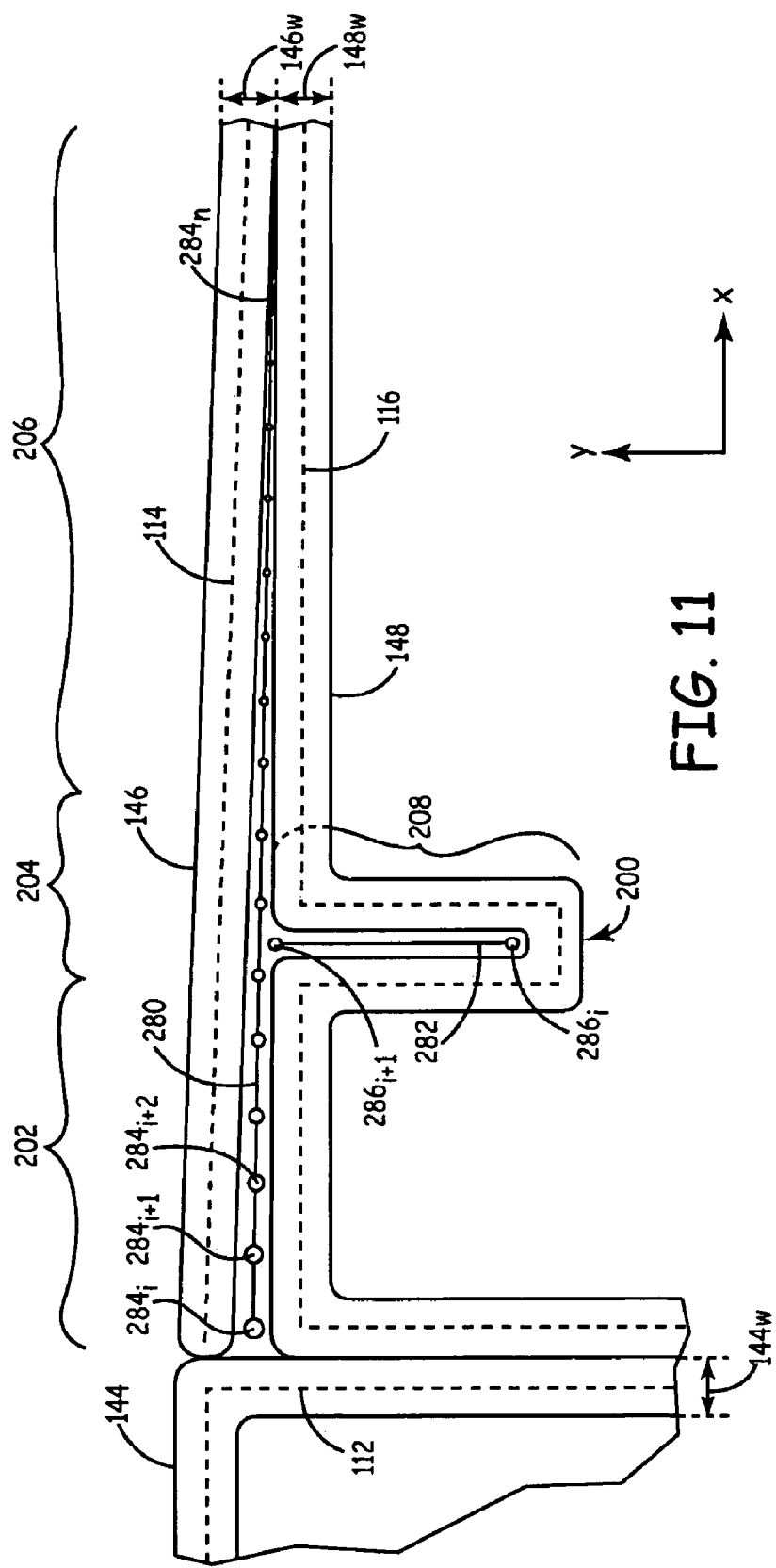
FIG. 11 is a fifth expanded view of section 3 taken in FIG. 1, where the void region includes remnant paths generated pursuant to the alternative method of the present invention.

FIG. 11 is an expanded view of void region 120 shown in FIGS. 7 and 8, where void region 120 includes first remnant path 280 and second remnant path 282 generated pursuant to method 214. First remnant path 280 includes a plurality of vertices $284_i$, $284_{i+1}$, $284_{i+2}$, ..., $284_n$, which are shown in FIG. 11 with varying radii for ease of discussion to illustrate the changes in the deposition rates. Similarly, second remnant path 280 includes vertices $286_i$ and $286_{i+1}$. As discussed above, each vertex includes an array of data in the form of (x, y, z, deposition rate), where the z-coordinate is held constant for a given layer, and the x-coordinate and the y-coordinate identify where a given vertex is located. The deposition rate data directs how fast the extrusion head deposits the build material at the given vertex.

As shown in FIG. 11, the radii of vertices $284_i$, $284_{i+1}$, $284_{i+2}$, ..., $284_n$ decrease generally along the x-axis in accordance with the decreasing void widths of void region 120 (without consideration to branched portion 208). As a result, build material may be deposited along first remnant path 280 with a decreasing deposition rate along the x-axis. This may be performed in the same manner as discussed above for remnant path 21 in FIG. 6. After build material is deposited along first remnant path 280, the extrusion head may then deposit build material along second remnant path 282. Because the void widths of branched portion 208 do not vary, second remnant path 282 is only defined by a starting vertex (i.e., vertex $286_i$) and a terminating vertex (i.e., vertex $286_{i+1}$).

During the extrusion process, roads of build material are deposited along perimeter paths 112, 114, and 116, which have physical road widths corresponding to road widths 144w, 146w, and 148w, respectively. This forms a cavity that corresponds to void region 120. After roads of build material are deposited along perimeter paths 112, 114, and 116, the extrusion head may deposit build material along first remnant path 280 at a varying deposition rate. Because the cavity corresponding to left arm 202, intersection 204, and right arm 206 is bordered by deposited roads of build material, the build material deposited along first remnant path 280 flows to conform to the dimensions of the bordering roads. This also allows the corresponding cavity corresponding to be filled based on a road width resolution that is higher than the first road width resolution, without adversely reducing the road height along first remnant path 280. The build material then fuses to the bordering roads of build material, thereby filling left arm 202, intersection 204, and right arm 206 of void region 120.

After build material is deposited along first remnant path 280, the extrusion head may deposit build material along second remnant path 282 (at a constant deposition rate). The build material deposited along second remnant path 282 also flows to conform to the dimensions of the bordering roads, which allows the cavity corresponding to branched portion 208 to be filled based on a road width resolution that is higher than the first road width resolution, without adversely reducing the road height along first remnant path 282. The build material then fuses to the bordering roads of build material (and to the build material deposited along first remnant path 280), thereby substantially filling branched portion 208 of void region 120.

The use of first remnant path 280 and second remnant path 282 allows void region 120 to be substantially filled, despite the branched nature of branched portion 208, while preserving the substantially uniform layer thickness. By filling the cavity corresponding to void region 120, the strength and integrity of the resulting 3D object is correspondingly preserved.

Figure 12:
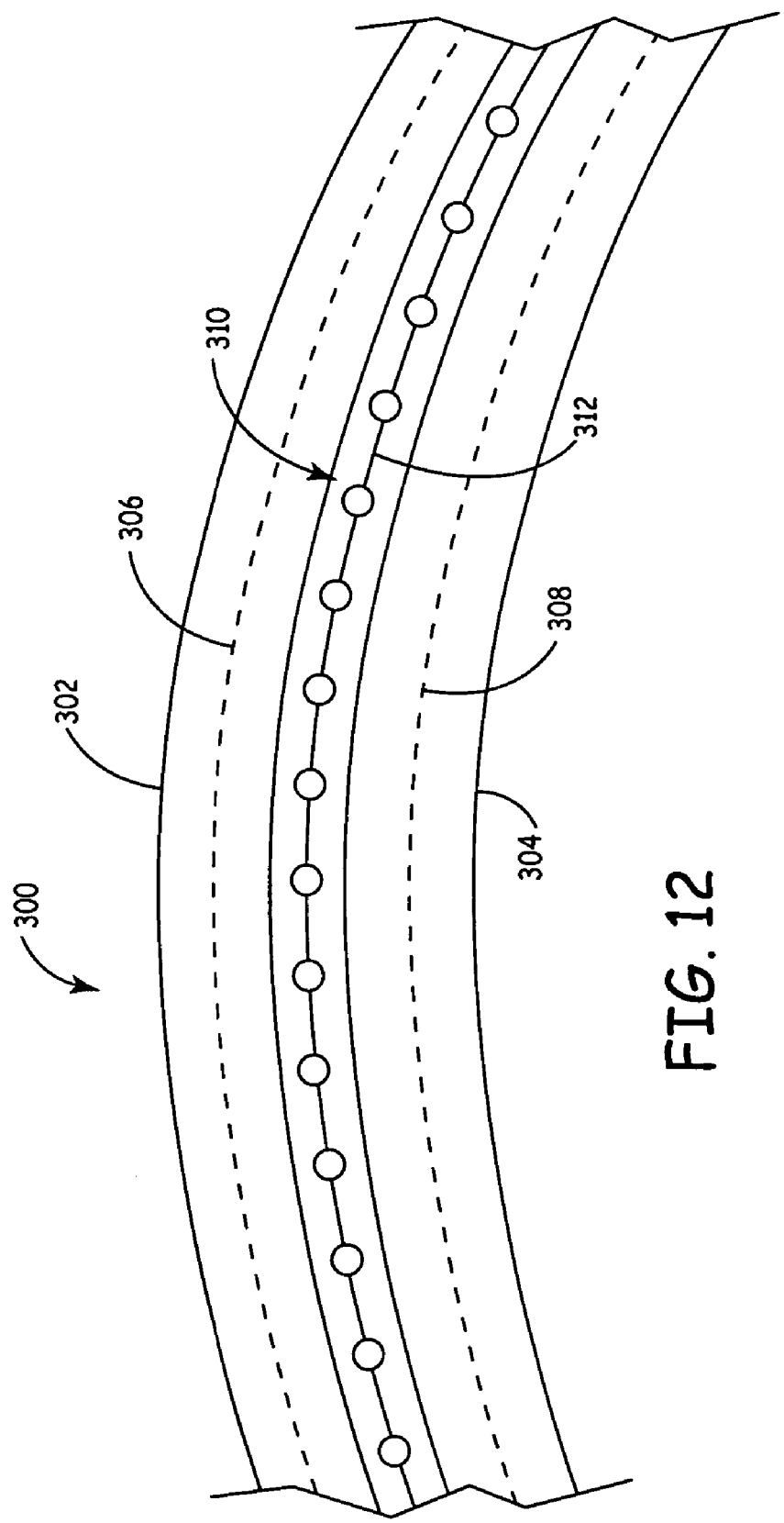
FIG. 12 is a top view of a build path generated by a host computer for building a layer of a 3D object pursuant to the alternative method of the present invention, which shows a curved void region.

FIG. 12 is a top view of build path 300, which includes theoretical curved roads 302 and 304. Theoretical curved roads 302 and 304 are dimensions that correspond to the physical roads of build material deposited by an extrusion head. Theoretical curved roads 302 and 304 are respectively centered around perimeter paths 306 and 308, and are based on the first road width resolution. As shown, theoretical curved roads 302 and 304 define void region 310, which contains remnant path 312. Build path 300 is an example of a curved path in which the methods of the present invention are suitable for filling with one or more remnant paths. Accordingly, the methods of the present invention, particularly, the methods involving multiple raster paths to generate remnant path 312 (e.g., method 214, discussed above), are suitable for filling annular void regions, such as concentric circle void regions.

Void region 310 is an example of a region in which the host computer may generate remnant path 312 pursuant to method 214, discussed above in FIG. 9. The curvature of theoretical curved roads 302 and 304 generally requires more than a single raster path to adequately define remnant path 312. The extrusion head may then deposit build materials along remnant path 312 to substantially fill void region 310, thereby preserving the structural integrity and sealing properties of the resulting 3D object.

While the above-discussed methods of generating remnant paths in void regions are described with particular ordered steps, the steps may be performed in a variety of arrangements or in parallel to obtain the desired results. Additionally, any number of intermediate paths may be used to generate remnant paths within void regions. For example, a plurality of raster paths may be generated within a given void region, where the raster legs of the raster paths are oriented at different angles relative to each other (e.g., perpendicular). The host computer may then switch between the raster paths to identify the optimal raster path for generating a remnant path.

While void regions 20, 120, and 310 are generally discussed above as being smaller than the first road width resolution used to generate the perimeters paths and the bulk raster paths, the host computer may alternatively be directed to identify large void regions. This embodiment may effectively eliminate the need for bulk raster paths in certain cases, but is generally limited by the maximum road width that a given deposition system is capable of depositing. Nonetheless, the present invention is particularly suitable for void regions that are smaller than the first road width resolution, thereby allowing such void regions to be filled to preserve the structural integrities of the resulting 3D objects.

Figure 13:
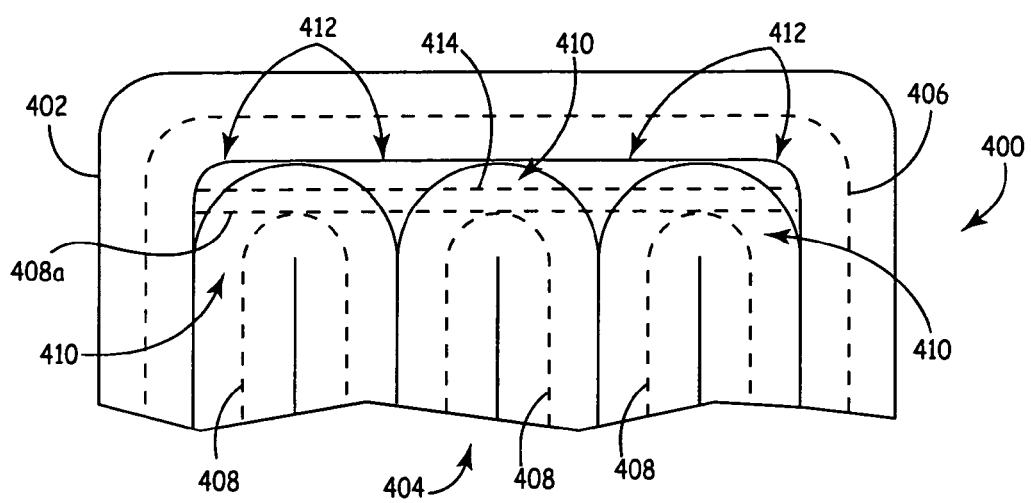
FIG. 13 is a top view of a build path generated by a host computer for building a layer of a 3D object, which shows void regions at intersections between perimeter paths and raster paths.

FIG. 13 is a top view of build path 400, which is another example of build data generated by a host computer for building a layer of a 3D object in an x-y plane. Build path 400 includes theoretical roads 402 and 404, which are dimensions corresponding to the physical roads of build material to be deposited, and which are based on the first road width resolution and respectively, perimeter path 406 and raster path 408.

As shown in FIG. 13, theoretical roads 404 are raster patterns defined by raster path 408, which include corners 410 where raster path 408 turns around about 180°. The placement of theoretical roads 402 and 404 results in a plurality of void regions 412 being formed between theoretical roads 402 and 404 at corners 410. Void regions 412 are also undesirable because they may increase the porosity of the resulting 3D object, thereby reducing the structural integrity and sealing properties. To correct this issue, the host computer may generate fill path 414, which is a deposition path that is generated at a higher resolution than the first road width resolution. As a result, build material is deposited along fill path 414 at a lower deposition rate relative to those based on theoretical roads 402 and 404.

Fill path 414 is desirably generated at a location between theoretical road 402 and raster path 408 at corners 410 (the boundary of raster path 408 at corners 410 is represented by phantom line 408*a*), which places fill path 414 over corners 410 and void regions 412. This allows a low volume of build material to be deposited along fill path 414 to at least partially fill in void region 412. The "low volume" is relative to the volumes used to deposit build roads along perimeter path 406 and raster path 408. Excess portions of build material deposited on corners 410 may be removed or smoothed over a larger surface area with a planarizer, which results in a smooth layer of deposited build material adjacent void regions 412. Fill paths 414 are desirably generated for each group of void regions 412 located at corners 410.

Fill path 414 may be generated at a higher resolution than the first road width resolution. As such, build material may be deposited along fill path 414 at a lower deposition rate relative to the deposition rates along perimeter path 406 and raster path 408. In one embodiment, fill path 414 may have a road width that varies, and may be generated as a remnant path. As discussed above in FIG. 2, method 22 of the present invention may also be used to generate remnant paths within void regions located between a perimeter path (e.g., raster path 12) and an adjacent bulk raster path (e.g., bulk raster path 18). In this embodiment, one or more intermediate paths may be generated between theoretical road 402 and raster paths 408 (i.e., phantom line 408*a*). The intermediate paths may then be used to generate fill path 414. Low volumes of build material may then be deposited along fill path 414 to fill void regions 412. The deposited road may then be planarized to smooth the given layer, which reduces the porosity of the resulting 3D.

Figure 14:
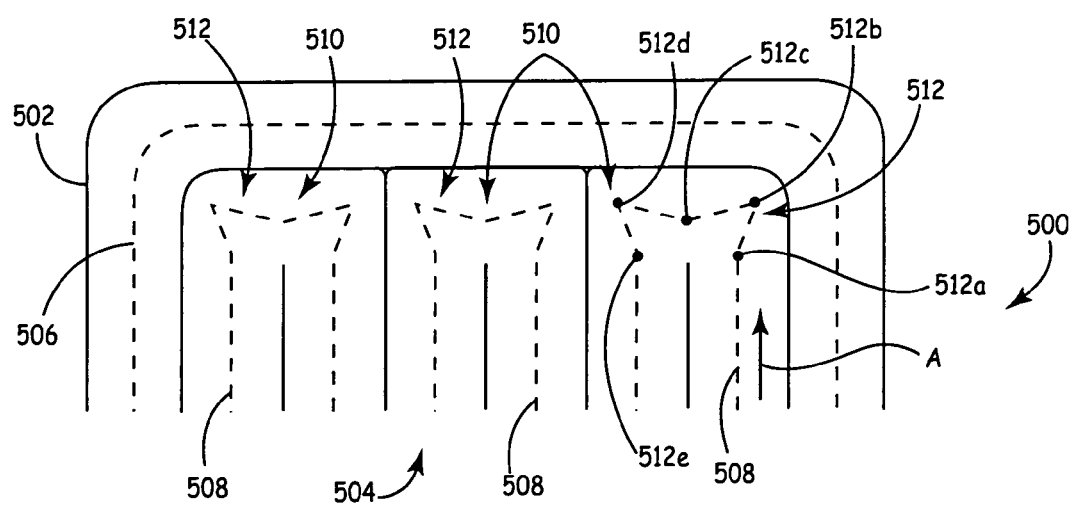
FIG. 14 is a top view of a build path generated by a host computer for building a layer of a 3D object, which shows alternative intersections between perimeter paths and raster paths to reduce formation of void regions.

FIG. 14 is a top view of build path 500, which is yet another example of build data generated by a host computer for building a layer of a 3D object in an x-y plane. Build path 500 includes theoretical roads 502 and 504, which are dimensions corresponding to the physical roads of build material to be deposited. Theoretical roads 502 and 504 are respectively centered around perimeter path 506 and raster path 508, and are based on the first road width resolution.

Theoretical roads 504 are raster patterns defined by raster path 508, which include corners 510 that similar to corners 410, discussed above in FIG. 13. However, in contrast to corners 410, raster path 508 includes "bat ear" protrusions 512 to reduce the formation of void regions adjacent corners 510. The reduction of void regions in this manner is generally discussed in Jamalabad et al., U.S. Pat. No. 6,823,230 ("the '230 patent"). However, the '230 patent discloses depositing build material along the protrusions at the first road width resolution with the remaining portion of the raster path. This is undesirable because the large volumes of build material deposited at the protrusions tend to force the previously deposited perimeter roads (corresponding to theoretical road 502) to bulge out, which undesirably deforms the lateral boundaries of the layer.

To reduce this problem, the deposition rate of build material may vary as the extrusion head moves around a given corner 510. In particular, the deposition rate may decrease as the extrusion head moves toward perimeter path 502 and increase as the extrusion head moves away from perimeter path 502. For example, an extrusion head may move along the first leg of raster path 508 toward perimeter path 506 (represented by arrow A) while depositing build material at a first deposition rate. When the extrusion head reaches vertex 512a, the deposition rate decreases, and the extrusion moves toward vertex 512b.

When the extrusion head reaches vertex 512b, the deposition rate decreases even more and the extrusion head moves along protrusions 512 until vertex 512c is reached. Because vertex 512c is located close to theoretical road 502, the deposition rate desirably remains unchanged at vertex 512c (i.e., the same deposition rate as assigned at vertex 512b). The extrusion head then moves along protrusions 512 until vertex 512d is reached. The deposition rate then increases at vertex 512d and the extrusion head moves toward vertex 512e. When the extrusion head reaches vertex 512e, the deposition rate may increase back to the first deposition rate to deposit the second leg along raster path 508.

By varying the deposition rate along raster path 508 at corners 510, the volume of build material deposited is accordingly decreased around the turns of corners 510 (i.e., at protrusions 512). This reduces the amount of force applied to perimeter path 506, which reduces the deformation to the lateral boundaries of the layer. The vertex locations along raster path 508 may be preset values or, alternatively, may be determined pursuant to the methods discussed above (e.g., methods 52 and 214). Additionally, a fill path similar to fill path 414 (discussed above in FIG. 13) may be deposited along corners 510 and planarized to ensure that the amount of build material deposited at corners 510 is enough to provide an even layer thickness along the z-axis.

Although the present invention has been described with reference to preferred embodiments, workers skilled in the art will recognize that changes may be made in form and detail without departing from the spirit and scope of the invention.

The invention claimed is:

1. A method of forming a three-dimensional object using an extrusion-based layered deposition system, the method comprising:
    generating a build path for building a layer of the three-dimensional object, wherein the build path defines a void region;
    generating at least one intermediate path in the void region;
    determining dimensions of the void region based at least in part on the at least one generated intermediate path; and
    generating a remnant path in the void region based at least in part on the at least one intermediate path, wherein the remnant path comprises deposition rates that are configured to vary based on the determined dimensions of the void region.

2. The method of claim 1, wherein the at least one intermediate path is generated based on a road width resolution limit that is higher than a road width resolution used to generate the build path.

3. The method of claim 1, wherein the at least one intermediate path comprises a raster path.

4. The method of claim 3, wherein the raster path comprises a plurality of raster legs, and wherein determining the dimensions of the void region comprises:
    determining center points of the raster legs; and
    determining void widths of the void region at the center points.

5. The method of claim 4, further comprising assigning the deposition rates to the center points.

6. The method of claim 1, wherein the at least one intermediate path comprises a first raster path and a second raster path, wherein the first raster path is offset at a rotational angle from the second raster path.

7. The method of claim 1, further comprising:
    depositing first deposition roads according to the generated build path to form the layer of the three-dimensional object having a cavity corresponding to the defined void region; and
    depositing the second deposition road in at least part of the cavity according to the generated remnant path.

8. A method of forming a three-dimensional object using an extrusion-based layered deposition system, the method comprising:
    generating a build path for building a layer of the three-dimensional object, the build path being based on a first road width resolution;
    identifying a void region in the build path;
    determining dimensions of the void region; and
    generating a remnant path in the void region, wherein the remnant path comprises deposition rates that are configured to vary based on the determined dimensions of the void region.

9. The method of claim 8, wherein the dimensions of the void region are determined based at least in part on a second road width resolution that is a higher resolution than the first road width resolution.

10. The method of claim 8 further comprising generating an intermediate path in the void region based on the second road width resolution.

11. The method of claim 10, wherein the intermediate path comprises a raster path.

12. The method of claim 11, wherein the raster path comprises a plurality of raster legs, and wherein determining the dimensions of the void region comprises:
    determining center points of the raster legs; and
    determining void widths of the void region at the center points.

13. The method of claim 8, further comprising generating a first raster path and a second raster path, wherein the first raster path is offset at a rotational angle from the second raster path.

14. The method of claim 8, further comprising:
    depositing first deposition roads according to the generated build path to form the layer of the three-dimensional object having a cavity corresponding to the defined void region; and
    depositing the second deposition road in at least part of the cavity according to the generated remnant path.

15. A method of forming a three-dimensional object using an extrusion-based layered deposition system, the method comprising:
    generating a build path for building a layer of the three-dimensional object with a plurality of first deposition roads based on a first road width resolution, wherein the build path defines a void region having dimensions that are smaller than the first road width resolution along at least one axis; and
    generating a remnant path in the void region for filling at least pan of a cavity corresponding to the defined void region with a second deposition road based on deposition rates that are configured to vary based on the dimensions of the void region.

16. The method of claim 15 further comprising generating an intermediate path in the void region.

17. The method of claim 16, wherein the intermediate path comprises a raster path.

18. The method of claim 17, wherein the raster path comprises a plurality of raster legs, and wherein generating the remnant path comprises:

determining center points of the raster legs;
determining void widths of the void region at the center points; and
determining the remnant path based at least in part on the center points and the void widths.

19. The method of claim 15, further comprising generating a first raster path and a second raster path, wherein the first raster path is offset at a rotational angle from the second raster path.

* * * * *